United States Patent
Shi et al.

(10) Patent No.: US 11,482,382 B2
(45) Date of Patent: Oct. 25, 2022

(54) ELECTROLYTIC CAPACITOR AND PROCESS FOR FORMING AN ELECTROLYTIC CAPACITOR

(71) Applicant: KEMET Electronics Corporation, Fort Lauderdale, FL (US)

(72) Inventors: Yaru Shi, Simpsonville, SC (US); Antony P. Chacko, Simpsonville, SC (US); Chenyi Gu, Simpsonville, SC (US); Ajaykumar Bunha, Simpsonville, SC (US); Qingping Chen, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 187 days.

(21) Appl. No.: 16/992,714

(22) Filed: Aug. 13, 2020

(65) Prior Publication Data

US 2020/0373089 A1    Nov. 26, 2020

Related U.S. Application Data

(63) Continuation-in-part of application No. 16/046,154, filed on Jul. 26, 2018, now Pat. No. 10,879,010,
(Continued)

(51) Int. Cl.
*H01G 9/00* (2006.01)
*H01G 9/028* (2006.01)
(Continued)

(52) U.S. Cl.
CPC ........... *H01G 9/0036* (2013.01); *H01B 1/127* (2013.01); *H01G 9/028* (2013.01); *H01G 9/0425* (2013.01); *H01G 9/15* (2013.01)

(58) Field of Classification Search
CPC ........ H01G 9/15; H01G 9/028; H01G 9/0036; H01G 9/0425
See application file for complete search history.

(56) References Cited

U.S. PATENT DOCUMENTS

| D586,767 S | 2/2009 | Guerrero et al. |
| D599,309 S | 9/2009 | Guerrero et al. |
| (Continued) | | |

FOREIGN PATENT DOCUMENTS

| CN | 102768903 | 11/2012 |
| EP | 0844284 A1 * | 5/1998 |
| (Continued) | | |

OTHER PUBLICATIONS

ISA/US; ISR and Written Opinion prepared for PCT/US2021/041272; dated Feb. 16, 2022.

*Primary Examiner* — David M Sinclair
(74) *Attorney, Agent, or Firm* — Joseph T. Guy; Patent Filing Specialist Inc.

(57) ABSTRACT

The invention is related to an improved capacitor and an improved process for forming a capacitor. The process comprises forming an anode comprising a dielectric on the anode. A cathode layer is then formed on the dielectric wherein the cathode layer comprises a self-doped conductive polymer and a cross-linker wherein a weight ratio of crosslinker to self-doped conductive polymer is at least 0.01 to no more than 2.

100 Claims, 1 Drawing Sheet

Related U.S. Application Data which is a continuation-in-part of application No. 15/595,137, filed on May 15, 2017, now Pat. No. 10,340,091, and a continuation-in-part of application No. 15/379,729, filed on Dec. 15, 2016, now Pat. No. 10,643,796, which is a continuation-in-part of application No. 14/743,195, filed on Jun. 18, 2015, now Pat. No. 9,941,055, which is a continuation-in-part of application No. 13/777,769, filed on Feb. 26, 2013, now Pat. No. 9,312,074.

(60) Provisional application No. 62/338,778, filed on May 19, 2016, provisional application No. 62/267,707, filed on Dec. 15, 2015, provisional application No. 61/603,635, filed on Feb. 27, 2012.

(51) Int. Cl.
*H01G 9/15* (2006.01)
*H01B 1/12* (2006.01)
*H01G 9/042* (2006.01)

(56) References Cited

U.S. PATENT DOCUMENTS

| | | |
|---|---|---|
| 7,658,986 B2 | 2/2010 | Poltorak et al. |
| D616,388 S | 5/2010 | Guerrero et al. |
| 8,313,538 B2 | 11/2012 | Merker et al. |
| 8,771,381 B2 | 7/2014 | Chen et al. |
| 8,808,403 B2 | 8/2014 | Qiu |
| 8,882,856 B2 | 11/2014 | Intelmann et al. |
| 9,030,807 B2 | 5/2015 | Chacko et al. |
| 2004/0074779 A1 | 4/2004 | Sotzing |
| 2004/0260016 A1* | 12/2004 | Louwet ............ H01B 1/127 524/817 |
| 2006/0076541 A1 | 4/2006 | Yoshida |
| 2006/0226396 A1 | 10/2006 | Majumdar |
| 2008/0005878 A1 | 1/2008 | Merker |
| 2010/0103590 A1* | 4/2010 | Saida ............ H01G 9/028 427/80 |
| 2010/0302709 A1 | 12/2010 | Dreissig |
| 2012/0057275 A1 | 3/2012 | Intelmann |
| 2014/0160632 A1 | 6/2014 | Chacko et al. |
| 2014/0211372 A1 | 7/2014 | Sugawara |
| 2015/0029642 A1 | 1/2015 | Shi et al. |
| 2015/0279503 A1 | 10/2015 | Scheel |
| 2016/0005545 A1 | 1/2016 | Burke |
| 2017/0207032 A1 | 7/2017 | Uher et al. |
| 2018/0321090 A1 | 11/2018 | Petrzilek et al. |
| 2020/0152393 A1 | 5/2020 | Shi et al. |

FOREIGN PATENT DOCUMENTS

| | | |
|---|---|---|
| EP | 1798785 | 6/2007 |
| WO | WO 2012/119711 | 9/2012 |

* cited by examiner

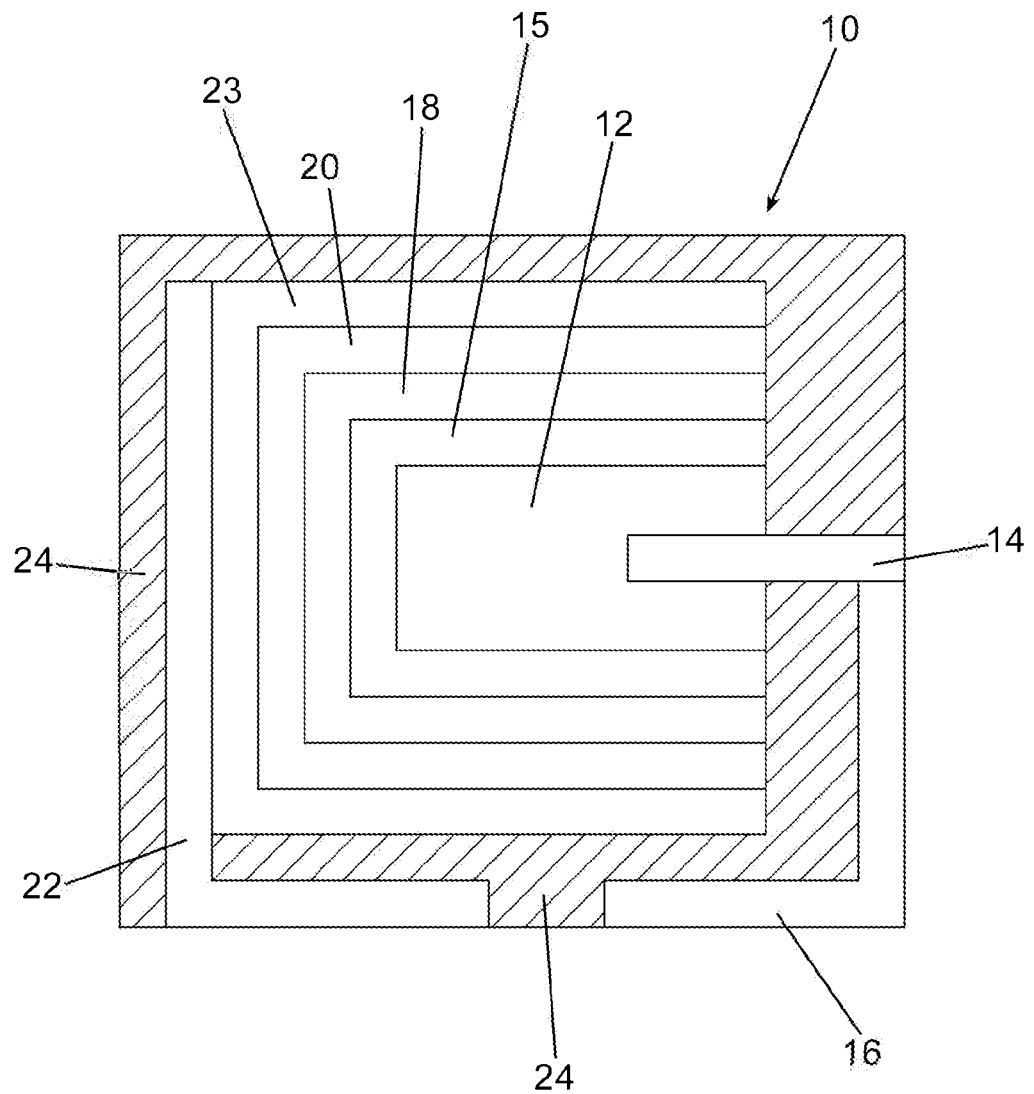

ELECTROLYTIC CAPACITOR AND PROCESS FOR FORMING AN ELECTROLYTIC CAPACITOR

CROSS-REFERENCE TO RELATED APPLICATIONS

The present invention is a continuation-in-part of U.S. patent application Ser. No. 16/046,154 filed Jul. 26, 2018 now U.S. Pat. No. 10,879,010 issued Dec. 29, 2020 which, in turn is a continuation-in-part of U.S. patent application Ser. No. 15/379,729 filed Dec. 15, 2016 now U.S. Pat. No. 10,643,796 issued May 5, 2020 which, in turn, claims priority to U.S. Pat. Appl. No. 62/267,707 filed Dec. 15, 2015. U.S. patent application Ser. No. 15/379,729 is a continuation-in-part application of U.S. patent application Ser. No. 14/743,195 filed Jun. 18, 2015, now U.S. Pat. No. 9,941,055 issued Apr. 10, 2018, which is, in turn, a continuation-in-part application of U.S. patent application Ser. No. 13/777,769 filed Feb. 26, 2013 now U.S. Pat. No. 9,312,074 issued Apr. 12, 2016, which in turn, claims priority to U.S. Provisional Patent Appl. No. 61/603,635 filed Feb. 27, 2012 all of which are incorporated herein by reference. application Ser. No. 16/046,154 is also a continuation-in-part of U.S. patent application Ser. No. 15/595,137 filed May 15, 2017 now U.S. Pat. No. 10,340,091 issued Jul. 2, 2019 which claims priority to U.S. Provisional Patent Application No. 62/338,778 filed May 19, 2016 both of which are incorporated herein by reference.

BACKGROUND

The present invention is related to an improved method of forming solid electrolytic capacitors and improved capacitors formed thereby. More specifically, the present invention is related to improved conductive polymer layers utilizing self-doped soluble conductive polymers and improvements in the method of cathode layer formation.

The construction and manufacture of solid electrolytic capacitors is well documented. In the construction of a solid electrolytic capacitor a, preferably valve, metal serves as the anode. The anode body can be either a porous pellet, formed by pressing and sintering a high purity powder, or a foil which is etched to provide an increased anode surface area. It is preferable that an oxide of the valve metal is electrolytically formed to cover all surfaces of the anode wherein the oxide serves as the dielectric of the capacitor. The solid cathode electrolyte is typically chosen from a very limited class of materials, to include manganese dioxide or electrically conductive organic materials such as polyaniline, polypyrrole, polythiophene and their derivatives. Solid electrolytic capacitors with intrinsically conductive polymers as the cathode material have been widely used in the electronics industry due to their advantageously low equivalent series resistance (ESR) and "non-burning/non-ignition" failure mode. In the case of conductive polymer cathodes, the conductive polymer is typically applied by either chemical oxidation polymerization, electrochemical oxidation polymerization or spray techniques with other less desirable techniques being reported.

The anode body is typically a porous structure because the porosity increases the surface area which increases capacitance for a given volume. The conductive cathode layer often comprises conductive materials such as the conductive polymer, carbon and silver layers for connection with terminals. It is extremely important for the porous anode surface to be sufficiently covered and in intimate contact with the conductive cathode layer and it is particularly preferred that the pores be completely impregnated with conductive cathode layer to achieve targeted capacitance. In a manufacturing process to produce conductive polymer-based valve metal capacitors the valve metal powder, such as tantalum, is mechanically pressed into anodes that are subsequently sintered to form porous bodies. The anodes are anodized to a pre-determined voltage in a liquid electrolyte to form a dielectric layer onto which a cathode layer of conductive polymer is formed. The conductive polymer is then coated with graphite and a metal layer followed by assembling and molding into a finished device.

Polythiophenes have long been considered the industry standard as a conductive polymer for the cathode of solid electrolytic capacitors. Though thiophenes are widely used throughout the industry they still have limitations, particularly, with regards to the counterion. Conductive polythiophenes are typically doped with a counterion which is typically an aromatic sulfonic acid such as toluene sulfonic acid, a polystyrene sulfonic acid, or a derivative thereof, which are referred to herein as foreign-doped conductive polymers for clarity. Foreign doped conductive polymers are dispersions of particles having a range of particle sizes. The particles, and particularly the lack of uniformity in particle size, causes challenges when trying to form a coating with adequate coverage and adhesion. It is also difficult to fill small pores with a dispersion and therefore foreign-doped conductive polymers are more difficult to be used for high charge density powders.

Self-doped conductive polymers are soluble and have been considered a viable option to avoid the problems associated with foreign-doped conductive polymers. One advantage of interest to those of skill in the art is the solubility. Since self-doped conductive polymers are very soluble there is no need for the coating of a dispersion and therefore improved coatings are expected. A soluble conductive polymer is also expected to better fill small pores and therefore they have potential for use with high charge density powders. An unexpected consequence is that the high solubility has proven to be detrimental since subsequent coats tend to dissolve the previously coated self-doped conductive polymer leading to a degradation of the coating which affects capacitance. Crosslinking has been described; however, too much crosslinking decreases the conductivity of the conductive layer and therefore it has not been as advantageous as expected.

The present application provides a method of manufacturing a capacitor comprising a self-doping conductive polymer with improved capacitance.

SUMMARY OF THE INVENTION

The present invention is related to improved compositions of self-doped conductive polymers and coatings made therewith and more specifically cross-linked self-doped conductive polymers and coatings made therewith.

More specifically, the present invention is related to the use of improved self-doped conductive polymer coatings as a cathode on a solid electrolyte capacitor.

A particular feature of the present invention is the ability to form conductive coatings on the dielectric of anodes having high capacitance which necessarily have very small pores These and other embodiments, as will be realized, are provided in a process for forming an electrolytic capacitor. The process comprises forming an anode comprising a dielectric on the anode. A cathode layer is then formed on the dielectric wherein the cathode layer comprises a self-doped conductive polymer and a cross-linker wherein a weight ratio of crosslinker to self-doped conductive polymer is at least 0.01 to no more than 2.

Yet another embodiment is provided in an electrolytic capacitor comprising an anode with a dielectric on the anode. A cathode layer is on the dielectric wherein the cathode layer comprises a cross-linked self-doped conductive polymer formed by a cross-linker. The cathode has a weight ratio of crosslinker to self-doped conductive polymer of at least 0.01 to no more than 2.

BRIEF DESCRIPTION OF DRAWINGS

FIG. 1 is a schematic cross-sectional representation of a capacitor.

DESCRIPTION

The present invention is related to a method of forming a solid electrolytic capacitor comprising self-doped conductive polymers, specifically cross-linked self-doped conductive polymers and improved capacitors formed thereby. More specifically, the present invention is related to improved conductive polymer compositions based on cross-linked self-doped conductive polymers and improved capacitors formed therewith.

The invention will be described with reference to the FIGURES forming an integral, non-limiting, component of the disclosure. Throughout the various FIGURES similar elements will be numbered accordingly.

An embodiment of the invention is illustrated in cross-sectional schematic side view in FIG. 1. In FIG. 1, a capacitor, generally represented at 10, comprises an anodized anode, 12, with an anode lead wire, 14, extending therefrom or attached thereto. The anode lead wire is preferably in electrical contact with an anode lead, 16. A precursor conductive layer, 15, is formed on the anodized anode and preferably the precursor conductive layer at least partially encases a portion of dielectric of the anodized anode. The precursor cathode layer can be formed by in-situ methods; however, it is preferable that the precursor conductive layer be formed by coating a self-doped, or soluble, conductive polymer solution and cross-linking the self-doped conductive polymer or layers containing the self-doped conductive polymer or layers adjacent thereto. Additional conductive polymer layers, collectively referred to at 18, are formed sequentially on the precursor conductive layer and at least partially encase at least a portion of the precursor conductive layer and form an encasement around at least a portion of the dielectric. The collective layers represented by 18 may also include intermediate layers between conductive polymer layers as will be more fully detailed herein. In a preferred embodiment all conductive cathode layers are formed from a self-doped conductive polymer which is soluble and, more preferably, at least some of the layers include cross-linked groups. As would be realized to those of skill in the art the cathode and anode are not in direct electrical contact in the finished capacitor. A cathode lead, 22, is in electrical contact with the cathode layers. It is well understood that soldering a lead frame, or external termination, to a polymeric cathode is difficult. It has therefore become standard in the art to provide conductive interlayers preferably comprising a carbon containing layer, 20, and a metal containing layer, 23, which allow solder adhesion. In many embodiments it is preferred to encase the capacitor in a non-conductive resin, 24, with at least a portion of the anode lead and cathode lead exposed for attachment to a circuit board as would be readily understood by one of skill in the art.

Self-doped conductive polymers are soluble and completely dissolve in a solvent or solvent mixture without detectable particles. For the purposes of the instant invention a particle size of below about 1 nm is considered below typical particle size detection limits and therefore defined as soluble. The solvent for the soluble conductive polymer can be water or organic solvents, or a mixture of water with miscible solvents such as alcohol and non-hydroxy polar solvents such as dimethyl sulfoxide (DMSO), dimethylformamide (DMF), dimethylacetamide (DMAc) and the like. A conductive polymer solution potentially can impregnate the pores of anodes as effectively as conductive polymers formed by in-situ methods and better than conductive polymer dispersion with detectable particles. Examples of soluble conductive polymers include conductive polymers of polyanilines, polypyrroles and polythiophenes each of which may be substituted.

The preferred self-doped polymer comprises repeating units represented by Formula A:

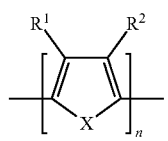

Formula A wherein:
$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl with the proviso that at least one of $R^1$ or $R^2$ is substituted with —$SO_3M$, —$CO_2M$ or —$PO_3M$ wherein M is H or a cation preferably selected from ammonium, sodium, lithium or potassium;
X is S, N or O and most preferable X is S;
$R^1$ and $R^2$ of Formula A are preferably chosen to prohibit polymerization at the β-site of the ring as it is most preferred that only α-site polymerization be allowed to proceed; it is more preferred that $R^1$ and $R^2$ are not hydrogen and more preferably, $R^1$ and $R^2$ are α-directors with ether linkages being preferable over alkyl linkages; it is most preferred that the $R^1$ and $R^2$ are small to avoid steric interferences.

In a particularly preferred embodiment the $R^1$ and $R^2$ of Formula A are taken together to represent —O—$(CHR^4)_n$—O— wherein:
n is an integer from 1 to 5 and most preferably 2;
$R^4$ is independently selected from a linear or branched $C_1$ to $C_1$ alkyl radical $C_5$ to $C_{12}$ cycloalkyl radical, $C_6$ to $C_{14}$ aryl radical $C_7$ to $C_{14}$ aralkyl radical or $C_1$ to $C_4$ hydroxyalkyl radical, wherein $R^4$ is substituted with —$SO_3M$, —$CO_2M$ or —$PO_3M$ and optionally substituted with at least one additional functional group selected from carboxylic acid, hydroxyl, amine, substituted amines, alkene, acrylate, thiol, alkyne, azide, sulfate, sulfonate, sulfonic acid, imide, amide, epoxy, anhydride, silane, and phosphate; hydroxyl radical; or $R^4$ is selected from $-(CHR^5)_a-R^{16}$; $-O(CHR^5)_aR^{16}$; $-CH_2O(CHR^5)_aR^6$; $-CH_2O(CH_2CHR^5O)_aR^{16}$, or $R^4$ is $-SO_3M$, $-CO_2M$ or $-PO_3M$;

$R^5$ is H or alkyl chain of 1 to 5 carbons optionally substituted with functional groups selected from carboxylic acid, hydroxyl, amine, alkene, thiol, alkyne, azide, epoxy, acrylate and anhydride;

$R^{16}$ is $-SO_3M$, $-CO_2M$ or $-PO_3M$ or an alkyl chain of 1 to 5 carbons substituted with $-SO_3M$, $-CO_2M$ or $-PO_3M$ and optionally further substituted with at least one functional group selected from carboxylic acid, hydroxyl, amine, substituted amines, alkene, thiol, alkyne, azide, amide, imide, sulfate, amide, epoxy, anhydride, silane, acrylate and phosphate;

a is integer from 0 to 10; and

M is a H or cation preferably selected from ammonium, sodium, lithium or potassium.

Exemplary self-doped conductive polymers are represented by S1 and S2.

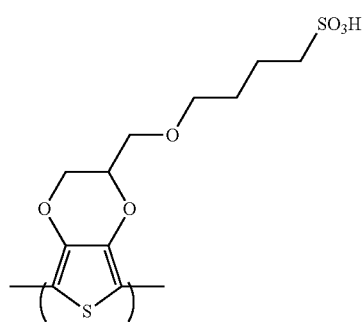

S1

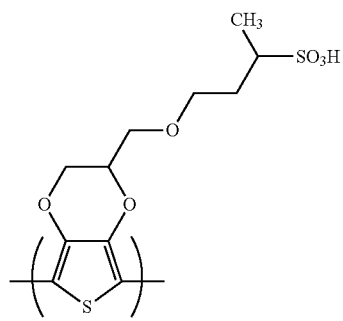

S2

S1 is a commercial polymer as a 2% solution in water. S2 is a commercial polymer as a 2% solution in water.

Self-doped conductive polymers can be formed in-situ by polymerization of monomers during deposition of the self-doped conductive polymer as well known in the art. It is preferable to use previously prepared self-doped conductive polymer wherein the self-doped conductive polymer is formed, preferably, in the presence of functional additives. Preformed self-doping conductive polymers are preferable due to reduced current leakage and an increase in breakdown voltage.

Crosslinkers are compounds with at least two reactive functional groups that are capable of reacting with adjacent functional groups ionically or covalently. In one embodiment a first functional group is on the self-doped conductive polymer, and the first functional group then reacts with a second functional group on the crosslinker. In another embodiment a first functional group is on a separate crosslinkable material either in the coating with the self-doping conductive polymer or in an adjacent layer, and the first functional group reacts with a second functional group on the crosslinker. When a crosslinkable material is used the crosslinkable material is crosslinked by the crosslinker thereby forming a matrix within which the self-doped conductive polymer is contained. This is particularly advantageous since the matrix inhibits dissolution of the self-doped conductive polymer without unnecessarily limiting electrical conductivity within the layer.

The crosslinkable material is preferably a compound, oligomer or polymer with at least one reactive group capable of reacting with a crosslinker. The reactive functionality is preferably selected from the group consisting of carboxylic, hydroxyl, amine, epoxy, anhydride, isocyanate, imide, amide, carboxyl, carboxylic anhydride, silane, oxazoline, (meth)acrylates, vinyls, maleates, maleimides, itaconates, allyl alcohol esters, dicyclo-pentadiene-based unsaturations, unsaturated $C_{12}$-$C_{22}$ fatty esters or amides, carboxylic acid salts or ammonium salts. Polyols are particularly suitable as crosslinkable material with ethylene glycol and polyglycerol being particularly suitable for demonstration of the invention. Crosslinkable material can carry the same functional groups as the crosslinker or they may even be the same compound as long as crosslinking reactions occur. Crosslinkable material may also serve as a crosslinker if it carries two or more reactive functional groups which react with self-doped conductive polymer or other types of crosslinkable material.

One embodiment includes a solid electrolytic capacitor comprising a crosslinkable material system which is an oligomer or polymer comprising multifunctional reactive groups. The oligomer or polymer preferably comprises at least one polymerized monomer selected from the group consisting of polyester, polyurethane, polyamide, polyamine, polyimide, silicone polyester, hydroxyl functional silicone, hydroxyethyl cellulose, polyvinyl alcohol, phenolic, epoxy, butyral, copolymers of these or mixture of these multifunctional polymers such as epoxy/amine, epoxy/anhydride, isocyanate/amine, isocyanate/alcohol, unsaturated polyesters, vinyl esters, unsaturated polyester and vinyl ester blends, unsaturated polyester/urethane hybrid resins, polyurethane-ureas, reactive dicyclopentadiene resins or reactive polyamides. The oligomer or polymer with multifunctional or multiple reactive groups preferably includes at least one carboxylic acid group and at least one hydroxyl function group. A particularly preferred oligomer or polymer with multifunctional reactive groups is a polyester containing carboxylic and hydroxyl functionality. In addition to oligomers or polymers, particles with surface functional groups can also take part in the crosslinking. Particles with functional groups are preferred wherein the functional groups are selected from carboxylic, hydroxyl, amine, epoxy, anhydride, isocyanate, imide, amide, carboxyl, carboxylic anhydride, silane, oxazoline, (meth)acrylates, vinyls, maleates, maleimides, itaconates, allyl alcohol esters, dicyclo-pentadiene-based unsaturations, unsaturated $C_{12}$-$C_{22}$ fatty esters or amides, carboxylic acid salts or quaternary ammonium salts. Particles can be nanoparticles or microparticles. One example of functionalized nanoparticles is organomodified nanoclay. When particles are used to crosslink self-doped conductive polymer, the conductive polymer are useful as external cathode coating outside the anode rather than inside pores.

One embodiment includes a solid electrolytic capacitor comprising a crosslinkable materials which is a cyclic organic compound that contain at least one hydroxy functionality and preferably at least another hydroxy or a carboxylic functionality as they also improve thermal stability of self-doped conductive polymer. The cyclic organic compounds can be aromatic, heterocyclic or alicyclic with aromatic being most preferred. Particularly preferred cyclic aromatic compounds are selected from phenol, cresol, nitrophenol, aminophenol, hydroxybenzoic acid (i.e., hydroxybenzene carboxylic acid), sulfosalicylic acid, dihydroxybenzene, dihydroxybenzoic acid (i.e., dihydroxybenzene carboxylic acid), hydroxybenzoate methyl (i.e., hydroxybenzene carboxylate methyl), hydroxybenzoate ethyl (i.e., hydroxybenzene carboxylate ethyl), hydroxybenzoate ethyl hexyl (i.e., hydroxybenzene carboxylate ethyl hexyl), methoxyphenol, ethoxyphenol, butoxyphenol, phenylphenol, cumyl phenol, amino nitrophenol, hydroxy nitrobenzoic acid (i.e., hydroxy nitrobenzene carboxylic acid), hydroxy nitrobenzoate methyl (i.e., hydroxyl nitrobenzene carboxylate methyl), sulfone salicylic acid, dihydroxybenzene, dihydroxybenzoic acid (i.e., dihydroxybenzene carboxylic acid), trihydroxybenzene, trihydroxybenzoic acid (i.e., trihydroxybenzene carboxylic acid), phenolsulfonic acid, cresol sulfonic acid, dihydroxybenzene sulfonic acid, nitro phenolsulfonic acid, and hydroxy indole.

The examples of the naphthalene compounds can include naphthol, nitro naphthol, hydroxynaphthoic acid (i.e., hydroxynaphthalene carboxylic acid), dihydroxy naphthol, trihydroxy naphthol, naphtholsulfonic acid, dihydroxy naphtholsulfonic acid, and nitro naphtholsulfonic acid.

The examples of the anthraquinone compounds can include hydroxyanthraquinone.

The examples of the heterocyclic compounds as the cyclic organic compound having at least one hydroxyl group can include 2,5-dicarboxy-3,4-dihydroxythiophene, 3-hydroxythiophene, 3,4-dihydroxythiophene, hydroxypyridine, and dihydroxypyridine.

The examples of the alicyclic compounds can include hydroxy cyclohexane, hydroxy cyclohexane carboxylic acid, hydroxy cyclohexane carboxylate methyl, and dihydroxycyclohexane.

Particularly preferred are phenolic acids and even more preferred are gallic acid and tannic acid.

Particularly preferred crosslinkers comprise melamines, isocyanates, epoxies, hexamethoxymelamines, glyoxals, furfural aldehydes, melamine formaldehyde condensates, divinyl sulfones, epoxy compounds and carboxylic compounds.

Organofunctional silanes and organic compounds with more than one crosslinking group, especially more than one epoxy group, are particularly suitable for use as crosslinkers for the instant invention especially when used in combination.

Organofunctional silane is defined by the formula:

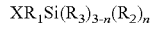

wherein X is an organic functional group such as amino, epoxy, anhydride, hydroxy, mercapto, sulfonate, carboxylate, phosphonate, halogen, vinyl, methacryloxy, ester, alkyl, etc; $R_1$ is an aryl or alkyl $(CH_2)_m$ wherein m can be 0 to 14; $R_2$ is individually a hydrolysable functional group such as alkoxy, acyloxy, halogen, amine or their hydrolyzed product; $R_3$ is individually an alkyl functional group of 1-6 carbons; n is 1 to 3.

The organofunctional silane can also be dipodal, define by the formula:

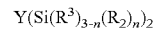

wherein Y is any organic moiety that contains reactive or nonreactive functional groups, such as alkyl, aryl, sulfide or melamine; $R_3$, $R_2$ and n are defined above. The organofunctional silane can also be multi-functional or polymeric silanes, such as silane modified polybutadiene, or silane modified polyamine, etc.

Examples of organofunctional silane include 3-glycidoxypropyltrimethoxysilane, 3-aminopropyltriethoxysilane, aminopropylsilanetriol, (triethoxysilyl)propylsuccinic anhydride, 3-mercaptopropyltrimethoxysilane, vinyltrimethoxysilane, 3-methacryloxypropyltrimethoxysilane, 3-trihydroxysilyl-1-propane sulfonic acid, octyltriethyoxysilane, bis(triethoxysilyl)octane, etc. The examples are used to illustrate the invention and should not be regarded as conclusive.

A particularly preferred organofunctional silane is glycidyl silane defined by the formula:

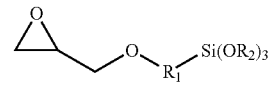

wherein $R_1$ is an alkyl of 1 to 14 carbons and more preferably selected from methyl ethyl and propyl; and each $R_2$ is independently an alkyl or substituted alkyl of 1 to 6 carbons.

A particularly preferred glycidyl silane is 3-glycidoxypropyltrimethoxysilane defined by the formula:

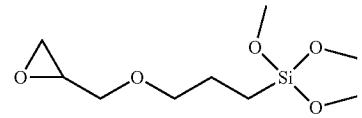

which is referred to herein as "Silane A" for convenience.

A crosslinker with at least two epoxy groups is referred to herein as an epoxy crosslinking compound and is defined by the formula:

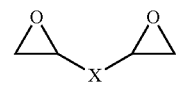

wherein the X is an alkyl or substituted alkyl of 0-14 carbons, preferably 0-6 carbons; an aryl or substituted aryl, an ethylene ether or substituted ethylene ether, polyethylene ether or substituted polyethylene ether with 2-20 ethylene ether groups or combinations thereof. A particularly preferred substitute is an epoxy group.

Examples of epoxy crosslinking compounds having more than one epoxy groups include ethylene glycol diglycidyl ether (EGDGE), propylene glycol diglycidyl ether (PGDGE), 1,4-butanediol diglycidyl ether (BDDGE), pentylene glycol diglycidyl ether, hexylene glycol diglycidyl ether, cyclohexane dimethanol diglycidyl ether, resorcinol glycidyl ether, glycerol diglycidyl ether (GDGE), glycerol polyglycidyl ethers, diglycerol polyglycidyl ethers, trimethylolpropane polyglycidyl ethers, sorbitol diglycidyl ether (Sorbitol-DGE), sorbitol polyglycidyl ethers, polyethylene glycol diglycidyl ether (PEGDGE), polypropylene glycol diglycidyl ether, polytetramethylene glycol diglycidyl ether, di(2,3-epoxypropyl)ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether, maleimide-epoxy compounds, etc.

A preferred epoxy crosslinking compound is glycidyl ether, defined by the formula:

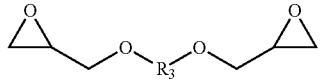

wherein $R_3$ is an alkyl or substituted alkyl of 1-14 carbons, preferably 2-6 carbons; an ethylene ether or polyethylene ether with 2-20 ethylene ether groups; an alkyl substituted with a group selected from hydroxy, or

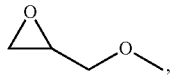

or $-(CH_2OH)_xCH_2OH$ wherein X is 1 to 14.

Particularly preferred glycidyl ethers are represented by:

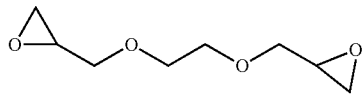

EGDGE: ethylene glycol diglycidyl ether

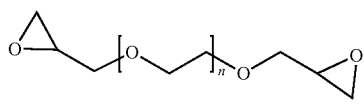

where n is an integer of 1 to 220;

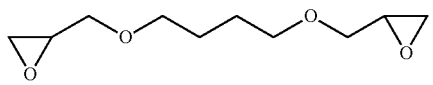

PEGDGE: polyethylene glycol diglycidyl ether

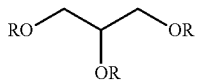

BDDGE: 1,4-butanediol diglycidyl ether

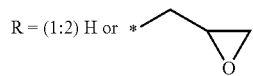

GDGE: glycerol diglycidyl ether

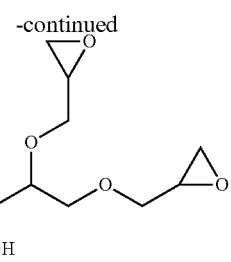

Sorbitol-DGE: sorbitol diglycidyl ether

Crosslinkers with at least two carboxylic functional groups is referred to herein as a carboxylic crosslinking compound.

Examples of carboxylic crosslinking compounds include but are not limited by, oxalic acid, malonic acid, succinic acid, glutaric acid, adipic acid, pimelic acid, suberic acid, azelaic acid, sebacic acid, dodecanedioic acid, phthalic acids, maleic acid, muconic acid, citric acid, trimesic acid, polyacrylic acid, etc. Particularly preferred organic acids are aromatic acid such as phthalic acid, and particularly ortho-phthalic acid, which decreases ESR. The reaction of the crosslinkable functionality and the crosslinkers occurs at elevated temperature which occurs during the normal processing steps of capacitor manufacture.

Crosslinking immobilizes the self-doped conductive polymer thereby inhibiting dissolution during subsequent process steps. Crosslinking is also detrimental to conductivity of the self-doped conductive polymer layer. A weight ratio of crosslinker to solid self-doped conductive polymer of about 0.01 to 2 is preferred. More preferable is a weight ratio of crosslinker to self-doped conductive polymer of about 0.02 to 1 even more preferable 0.05 to 0.2. Below about 0.01 weight ratio the degree of crosslinking is insufficient to sufficiently inhibit dissolution during subsequent process steps. Above about 2 weight ratio the crosslinking causes a degradation in conductivity of the self-doped conductive polymer layer.

It has been preferred that the self-doped conductive polymers are substantially free of foreign dopant, with no more than 5 wt % being considered acceptable, due to the detrimental interaction of the anion groups of the dopant with the self-doping conductive polymer. It is now surprisingly realized that larger amounts of a foreign dopant, particularly polystyrene sulfonic acid or a derivative thereof actually have benefits including capacitance, capacitance stability, and Breakdown Voltage (BDV). While not limited to theory, it is now understood that a particular problem with self-doped conductive polymer is thermal instability of the anion portion of the self-doped conductive polymer. The addition of some foreign dopant, preferably polymeric foreign dopant, mitigates the degradation which occurs during various thermal excursions which occur during preparation of the polymer and during use of the polymer. The polymeric foreign dopant is preferably added in an amount of about 7 wt % to 100 wt % based on the weight of the self-doped conductive polymer. Above about 100 wt % foreign dopant, too much excess polymeric dopant could cause significant ESR increase. In addition, the self-doped conductive polymer begins to coagulate into particles which is undesirable and contrary to the reason for the use of self-doping conductive polymer. Below about 7 wt % foreign dopant the impact is insufficient to justify the addition as no mitigation of thermal instability is realized. More preferably, the foreign dopant is added in an amount of 8 wt % to 20 wt %. It is further hypothesized that dopants, and particularly polymeric dopants, such as polystyrene sulfonic acid present in sufficient amount could interact with multiple sites of self-doped conductive polymer, which prevents dissolution of self-doped polymer upon the application of subsequent layers. When an additional crosslinker is used, excess polymeric dopant could mitigate the effects of cross-linking thereby allowing for a cross-linked self-doped conductive polymer with adequate conductivity.

Particularly preferred polymeric foreign dopants are polystyrene sulfonic acids and derivatives thereof optionally in the form of a random copolymer comprising groups A, B and C represented by the ratio of Formula B:

$$A_xB_yC_z \qquad \text{Formula B}$$

wherein:
A is polystyrenesulfonic acid or salt of polystyrenesulfonate;
B and C separately represent polymerized units substituted with a group selected from:
-carboxyl groups;
—$C(O)OR^6$ wherein $R^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—$(CHR^7CH_2O)_b$—$R^8$ wherein:
$R^7$ is selected from a hydrogen or an alkyl of 1 to 7 carbons and preferably hydrogen or methyl;
b is an integer from 1 to the number sufficient to provide a molecular weight of up to 200,000 for the —$CHR^7CH_2O$— group; and
$R^a$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—$C(O)$—$NHR^9$ wherein:
$R^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—$C_6H_4$—$R^{10}$ wherein:
$R^{10}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and —$(O(CHR^{11}CH_2O)_d$—$R^{12}$ wherein:
$R^{11}$ is a hydrogen or an alkyl of 1 to 7 carbons and preferably hydrogen or methyl; d is an integer from 1 to the number sufficient to provide a molecular weight of up to 200,000 for the —$CHR^{11}CH_2O$— group;
$R^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—$C_6H_4$—O—$R^{13}$ wherein:

$R^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and —$(CHR^{14}CH_2O)_e$—$R^{15}$ wherein:
$R^{14}$ is a hydrogen or an alkyl of 1 to 7 carbons and preferably hydrogen or methyl; e is an integer from 1 to the number sufficient to provide a molecular weight of up to 200,000 for the —$CHR^{14}CH_2O$— group; and
$R^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
in one embodiment y and z are 0; and
in another embodiment x, y and z, taken together are sufficient to form a polyanion with a molecular weight of at least 100 to no more than 500,000 and y/x is 0.01 to 100; z is 0 to a ratio z/x of no more than 100; more preferably x represents 50-99%, y represents 1 to 50% and z represents 0 to 49% of the sum total of x+y+z; even more preferably x represents 70-90%; y represents 10 to 30% and z represents 0 to 20% of the sum total of x+y+z.

Monomeric foreign dopants show beneficial effect on power cycling capacitance stability when applied with self-doped conductive polymer either as an additive in the self-doped polymer solution or as a separate layer next to the conductive polymer. In addition to capacitance benefit, these monomeric foreign dopants improve thermal stability of the self-doped conductive polymer. Aromatic sulfonic acids are more advantageous than aliphatic sulfonic acids, particularly, for thermal oxidation stability. Aromatic acids with additional functionalities such as additional sulfonic acid groups, carboxylic acid groups, hydroxy groups or quinone groups are more effective and more preferred. Aliphatic sulfonic acids with carboxylic functionality provide better thermal stability enhancing capability than the ones without carboxylic groups. This is not surprising as carboxylic acid functionality can serve as dopants for conductive polymer as well. Monomeric foreign dopants can reduce swelling of dried self-doped conductive polymer film wherein the swelling is attributed to the solubility of the self-doped conductive polymer. Monomeric foreign dopant is preferably added in an amount of about 7 wt % to 100 wt % based on the weight of the self-doped conductive polymer and more preferably in an amount of about 8 wt % to 20 wt %.

The self-doped conductive polymer can be mixed with foreign dopants as described previously. Another approach is to polymerize self-doping group containing monomer in the presence of foreign dopants or in the presence of both non-self-doping monomer and foreign dopants.

It is particularly preferred to incorporate functional additives to the coating comprising the self-doping conductive polymers or an adjacent coating layer. Particularly preferred functional additives include ionic liquids; non-ionic polyols and particularly polyglycerols; and polyalkylene ethers. A weight ratio of functional additive to self-doped conductive polymer of 0.05-5 is preferable. Below about 0.05 weight ratio the function is insufficient. Above a weight ratio of about 5 the conductivity diminishes. A weight ratio of about 0.5 to about 1 is preferable.

Ionic liquids are particularly suitable for use in the instant invention for increased capacitance and for improved thermal stability.

Ionic liquids (ILs) are generally defined as organic/inorganic salts with a melting point lower than 100° C. which present a good chemical and electrochemical stability, low flammability, negligible vapor pressure and high ionic conductivity. In a liquid state and with negligible vapor pressure. Ionic liquids are commonly considered as green solvents for industrial production. ionic liquids are organic salts in which the ions are poorly coordinated and melt below 100° C., or even at room temperature. Ionic liquids have a wide electrochemical operational window and comparably high matrix mobility at room temperature. Because ionic liquids are entirely composed of ions, their charge density is much higher than that of an ordinary salt solution.

Particularly preferred ionic liquids are selected from the group consisting of:

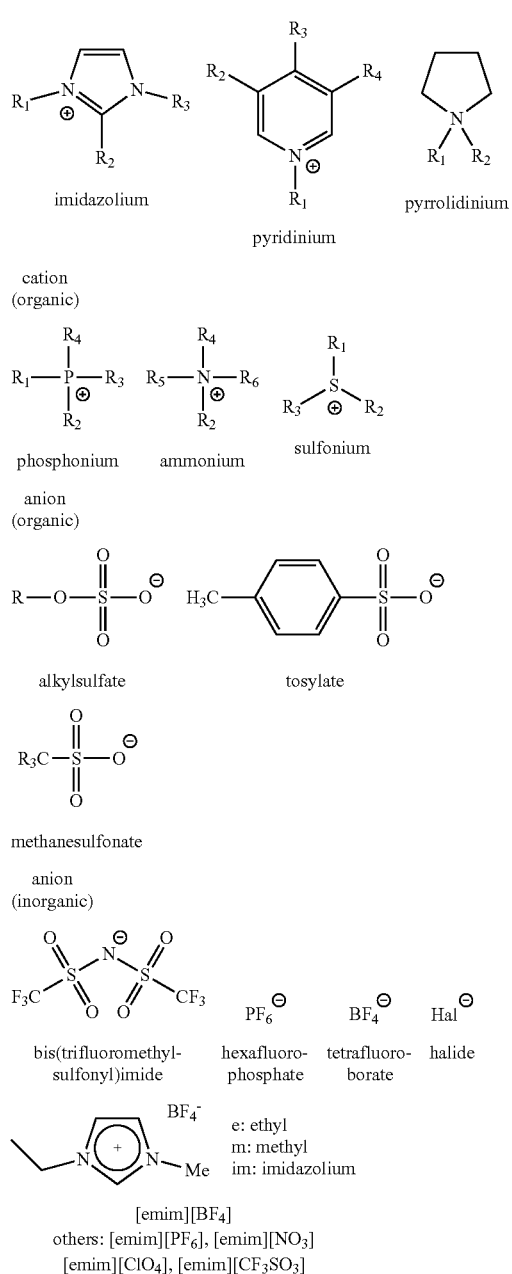

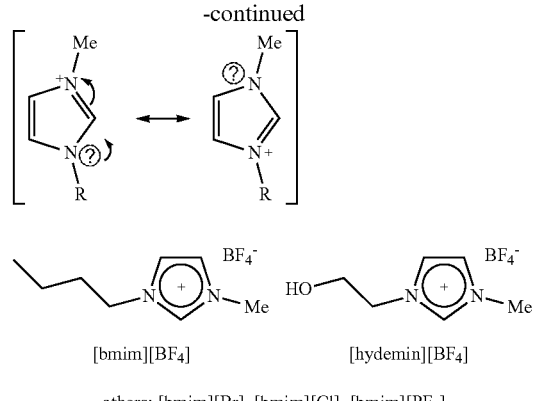

Particularly preferred ionic liquids comprise a cation selected from the group consisting of 1,2,3,4-tetramethylimidazolinium; 1,3,4-trimethyl-2-ethylimidazolinium; 1,3-dimethyl-2,4-diethylimidazolinium; 1,2-dimethyl-3,4-diethylimidazolinium; 1-methyl-2,3,4-triethylimidazolinium; 1,2,3,4-tetraethyl-imidazolinium; 1,2,3-trimethylimidazolinium; 1,3-dimethyl-2-ethylimidazolinium; 1-ethyl-2,3-dimethylimidazolinium and 1,2,3-triethylimidazolinium. Exemplary ionic liquids are selected from the group consisting of: 4-(3-Butyl-1-imidazolio)-1-butanesulfonic acid triflate, 1-Butyl-3-methylimidazolium octyl sulfate, 1-Butyl-3-methylimidazolium trifluoromethanesulfonate, 1-Ethyl-3-methylimidazolium trifluoromethanesulfonate, 1-Ethyl-3-methylimidazolium bis(trifluoromethylsulfonyl)imide, 1-Allyl-3-methylimidazolium bis(trifluoromethylsulfonyl)imide, 1-(2-Hydroxyethyl)-3-methylimidazolium bis(trifluoromethylsulfonyl)imide, 1-ethyl-3-methylimidazolium tetrafluoroborate, Bis(trifluoromethane)sulfonimide lithium and derivatives thereof.

Poly(ionic liquid)s (PILs), refer to a subclass of polyelectrolytes that feature an ionic liquid species in each monomer repeating unit, connected through a polymeric backbone to form a macromolecular architecture as set forth in *Progress in Polymer Science* Volume 38, Issue 7, July 2013, Pages 1009-1036. Some of the unique properties of ionic liquids are incorporated into the polymer chains, giving rise to a new class of polymeric materials. Polymeric ionic liquids expand the properties and applications of ionic liquids and common polyelectrolytes. Due to the solvent-independent ionization state of the ionic liquid species, polymeric ionic liquids are permanent and strong polyelectrolytes. The characteristic feature of absorbing water is a common feature of ionic liquids and polymeric ionic liquids.

Exemplary polymeric ionic liquids are selected from the group consisting of:
Cationic PILs
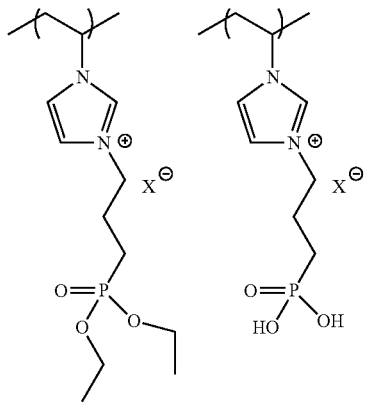
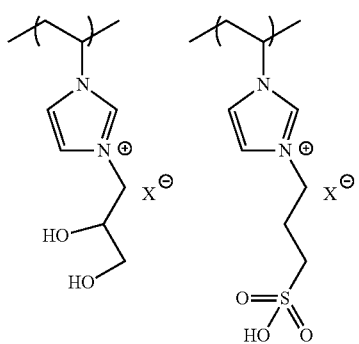
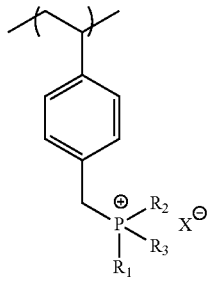
n = alkyl chains
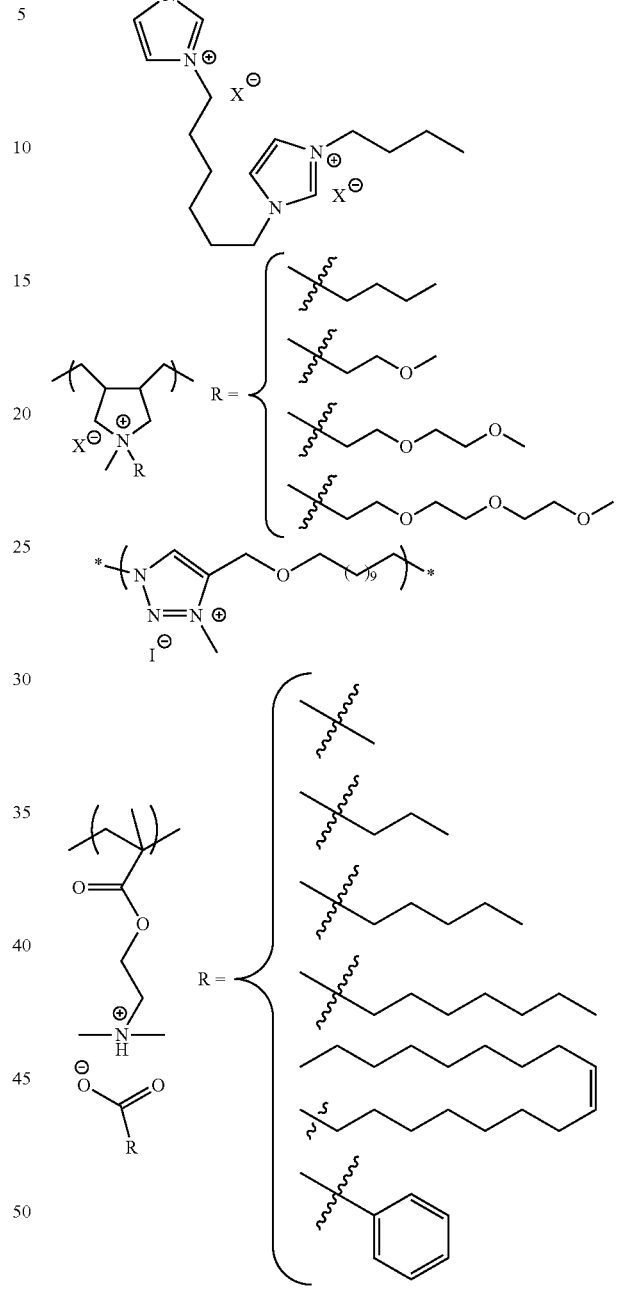
Anionic PILs
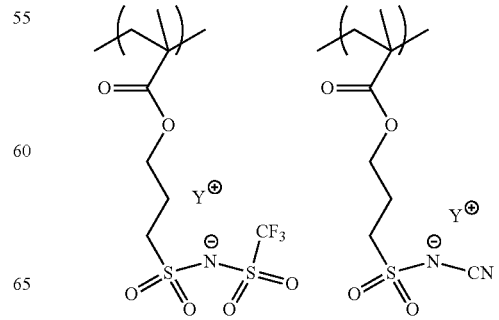

-continued

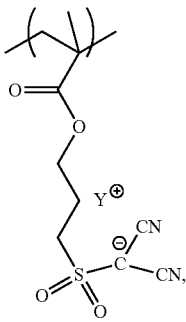

and derivatives thereof.

For the purposes of the present invention a non-ionic polyol is an alkyl alcohol with multiple hydroxyl groups or alkyl ethers with multiple hydroxyl groups on the alkyl groups.

Particularly preferred non-ionic polyols are $CH_2OH(CHOH)_2CH_2OH$ or erythritol, $CH_2OH(CHOH)_3CH_2OH$ as ribitol or xylitol, $CH_2OHC(CH_2OH)_2CH_2OH$ or pentaerythritol, $CH_2OHC(CH_3)_2CH_2OH$ or 2,2-dimethyl-1,3-propanediol; $CH_2OH(CHOH)_4CH_2OH$ or sorbitol, $CH_2OH(CHOH)_4CH_2OH$ or manitol, $CH_3C(CH_2OH)_3$ or trimethylolethane and $O(CH_2C(C_2H_5)CH_2OH)_2)_2$ or di-trimethylolpropane, $CH_2OH(CHOH)_4COH$ or glucose, $CH_2OH(CHOH)_3COCH_2OH$ or fructose, $C_{12}H_{22}O_{11}$ or sucrose or lactose, glycerol, diglycerol, triglycerol, tetraglycerol, polyglycerols.

Any of a variety of hydroxy-functional nonionic polymers may generally be employed. In one embodiment, for example, the hydroxy-functional polymer is a polyalkylene ether. Polyalkylene ethers may include polyalkylene glycols such as polyethylene glycols, polypropylene glycols polytetramethylene glycols, polyepichlorohydrins; polyoxetanes, polyphenylene ethers, polyether ketones, and the like. Polyalkylene ethers are typically predominantly linear, nonionic polymers with terminal hydroxy groups. Particularly suitable are polyethylene glycols, polypropylene glycols and polytetramethylene glycols (polytetrahydrofurans). The diol component may be selected, in particular, from saturated or unsaturated, branched or unbranched, aliphatic dihydroxy compounds containing 5 to 36 carbon atoms or aromatic dihydroxy compounds, such as, for example, pentane-1,5-diol, hexane-1,6-diol, neopentyl glycol, bis-(hydroxymethyl)-cyclohexanes, bisphenol A, dimer diols, hydrogenated dimer diols or even mixtures of the diols mentioned.

In addition to those noted above, other hydroxy-functional nonionic polymers may also be employed. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10\text{-}16}$—$(O$—$C_2H_4)_{1\text{-}25}$—OH such as octaethylene glycol monododecyl ether and pentaethylene glycol monododecyl ether; polyoxypropylene glycol alkyl ethers having the general formula: $CH_3$—$(CH_2)_{10\text{-}16}$—$(O$—$C_3H_6)_{1\text{-}25}$—OH; polyoxyethylene glycol octylphenol ethers having the following general formula: $C_8$—$H_{17}$—$(C_6H_4)$—$(O$—$C_2H_4)_{1\text{-}25}$—OH such as Triton™ X-100; polyoxyethylene glycol alkylphenol ethers having the following general formula: $C_9$—$H_{19}$—$(C_6H_4)$—$(O$—$C_2H_4)_{1\text{-}25}$—OH such as nonoxynol-9; polyoxyethylene glycol esters of $C_8$-$C_{24}$ fatty acids, such as polyoxyethylene glycol sorbitan alkyl esters such as polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate and polyoxyethylene glycerol alkyl esters such as polyoxyethylene-23 glycerol laurate and polyoxyethylene-20 glycerol stearate; polyoxyethylene glycol ethers of $C_8$-$C_{24}$ fatty acids such as polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether; block copolymers of polyethylene glycol and so forth.

The functional additives can be in the same layer with the self-doped conductive polymer or they can be applied as a protective layer on top of the conductive polymer. The functional additives stabilize ESR, capacitance and power cycling capacitance.

Functional additive can also be applied together with crosslinker or in some cases, they may be even in the same molecule.

The present invention is particularly suitable for use with high CV/g powders. Conductive polymers have been difficult to use with high CV/g powders due to the small pore sizes which are difficult to impregnate with conductive polymer dispersions. In-situ formed conductive polymers can impregnate small pores, however, the conductive polymer formation is difficult to control leading to insufficient coatings and issues with leakage current. The instant invention is particularly suitable for powders, particularly tantalum powders, with a charge density of at least 45,000 CV/g, more preferably at least 100,000 CV/g and even more preferably 200,000 CV/g.

In one embodiment differential dissolution rates in adjacent layers are utilized to inhibit dissolution of a previously applied layer. The dissolution rates can be altered by solvent mixtures with different solvents for multiple conductive polymer impregnation cycles. For example, alkylamine in a self-doped conductive polymer solution can make it soluble in polar solvents such as alcohol, DMG, DMAc and DMSO. By changing solvents between self-doped conductive polymer impregnation cycles, it is possible to minimize the chance of previously impregnated and dried polymer film re-dissolving. A potential benefit of using organic solvents for these modified self-doped conductive polymers is that organic solvents may yield better wetting and impregnation and therefore better capacitance, especially for high charge powders. Of course, co-solvents and surfactants added to water based self-doped conductive polymer solution could also improve capacitance.

EXAMPLES

Comparative Example 1

A series of 220 microfarads, 6V tantalum anodes with a specific charge of 120,000 μFV/g were prepared. The tantalum was anodized to form a dielectric on the tantalum anode at predesignated formation voltage (Vf). The anode thus formed was dipped into self-doped conductive polymer solution, using polymer S2, for 1 min and oven dried to remove water. This process was repeated 9 times. A layer of a diamine salt solution was applied and dried. A foreign doped polythiophene conductive polymer dispersion was then applied to form a subsequent polymer layer. This process was repeat 4-5 more times, followed by sequential coating of a graphite layer and a silver layer to produce a solid electrolytic capacitor. Parts were assembled and packaged. Capacitance, ESR, and BDV were measured on packaged parts. Capacitance Recovery % was calculated by dividing capacitance value by wet capacitance tested after dielectric formation. The package parts were mounted on circuit boards and tested for power cycling capacitance change before and after 50,000 power surge cycles.

Inventive Example 1

A series of Tantalum capacitors were prepared as described in Comparative Example 1, except that the self-doped conductive polymer solution contained 0.1 wt % of an epoxy silane crosslinker.

Inventive Example 2

A series of Tantalum capacitors were prepared as described in Comparative Example 1, except that the self-doped conductive polymer solution contained 0.2 wt % of polystyrene sulfonic acid.

Comparative Example 2

A series of 47 microfarads, 16V tantalum anodes with a specific charge of 133,000 μFV/g were prepared. The tantalum was anodized to form a dielectric on the tantalum anode. The anode thus formed was dipped into self-doped conductive polymer solution, using polymer S2, for 1 min and oven dried to remove water. This process was repeated 9 times. A foreign doped polythiophene conductive polymer dispersion was then applied to form a subsequent polymer layer. After drying, a layer of a diamine salt solution was applied and dried. Then the foreign doped polythiophene conductive polymer dispersion was applied and dried 4-5 more times, followed by sequential coating of a graphite layer and a silver layer to produce a solid electrolytic capacitor. Parts were assembled and packaged. Capacitance and ESR were measured on packaged parts.

Inventive Example 3

A series of Tantalum capacitors were prepared as described in Comparative Example 2, except that the self-doped conductive polymer solution contained 0.2 wt % of polystyrene sulfonic acid.

Inventive Example 4

A series of Tantalum capacitors were prepared as described in Comparative Example 2, except that the self-doped conductive polymer solution contained 0.5 wt % of polystyrene sulfonic acid.

Inventive Example 5

A series of Tantalum capacitors were prepared as described in Comparative Example 2, except that the self-doped conductive polymer solution contained 1.0 wt % of polystyrene sulfonic acid.

Comparative Example 3

A series of 10 microfarads, 50V tantalum anodes with a specific charge of 12,000 μFV/g were prepared. The tantalum was anodized to form a dielectric on the tantalum anode. The anode thus formed was dipped into a self-doped conductive polymer solution, using polymer S2, for 1 min and oven dried to remove water. This process was repeated one more time. The anode was then dipped in a first commercial conductive polymer dispersion Clevios Knano LV from Heraeus for 1 minute and oven dried to remove water. This process was repeated until a sufficient thickness was achieved. A second conductive polymer dispersion containing epoxy and silane compounds was applied to form an external polymer layer. After drying, alternating layers of a diamine salt and the second conductive polymer dispersion was applied and repeated 4-5 more times. The anodes with the conductive polymer layers were washed in water and dried, followed by sequential coating of a graphite layer and a silver layer to produce a solid electrolytic capacitor. Parts were assembled and packaged. The packaged parts were then mounted on circuit boards. Power Cycling Capacitance % before and after 50,000 power surge cycles was measured on mounted parts.

Inventive Example 6

A series of Tantalum capacitors were prepared as described in Comparative Example 3, except that the self-doped conductive polymer solution contained 0.2 wt % of 1,5-naphthalene sulfonic acid.

Inventive Example 7

A series of Tantalum capacitors were prepared as described in Comparative Example 3, except that after 2 cycles of self-doped conductive polymer coating, the anode was dipped in a 0.5 wt % solution of 1,5-naphthalene sulfonic acid and dried before subsequent process steps.

Comparative Example 4

0.5 gram of self-doped conductive polymer solution, using polymer S2, was dried on a glass slide at 150° C. to make a conductive polymer film. Conductivity of the dried film was measured (Day 0). The conductive polymer film was stored at 150° C. for 9 days and conductivity was read at Days 1, 6 and 9.

Inventive Example 8

A conductive polymer film was prepared, and its conductivity was tested as described in Comparative Example 4, except that 1 wt % of a polystyrene sulfonic acid was added into self-doped conductive polymer solution, using polymer S2, before drying.

Inventive Example 9

A conductive polymer film was prepared, and its conductivity was tested as described in Comparative Example 4, except that 1 wt % of p-toluene sulfonic acid was added into self-doped conductive polymer solution, using polymer S2, before drying.

Inventive Example 10

A conductive polymer film was prepared, and its conductivity was tested as described in Comparative Example 4, except that 1 wt % of 1,5-naphthalene sulfonic acid was added into self-doped conductive polymer solution, using polymer S2, before drying.

Comparative Example 5

0.5 gram of Self-doped conductive polymer solution, using polymer S2, was dried on a glass slide at 150° C. to make a conductive polymer film. Conductivity of the dried film was measured (Day 0). The conductive polymer film was stored at 150° C. for 7 days and conductivity was read at Days 1, 4 and 7.

Inventive Example 11

A conductive polymer film was prepared, and its conductivity was tested as described in Comparative Example 5, except that 1 wt % of sulfoacetic acid was added into self-doped conductive polymer solution before drying.

Inventive Example 12

A conductive polymer film was prepared, and its conductivity was tested as described in Comparative Example 5, except that 1 wt % 2-sulfobenzonic acid was added into self-doped conductive polymer solution before drying.

Inventive Example 13

A conductive polymer film was prepared, and its conductivity was tested as described in Comparative Example 5, except that 1 wt % of 5-sulfoisophthalic acid sodium salt was added into self-doped conductive polymer solution before drying.

Inventive Example 14

A conductive polymer film was prepared, and its conductivity was tested as described in Comparative Example 5, except that 1 wt % of 5-sulfosalicylic acid was added into self-doped conductive polymer solution before drying.

Inventive Example 15

A conductive polymer film was prepared, and its conductivity was tested as described in Comparative Example 5, except that 1 wt % of anthraquinone-2-sulfonic acid sodium salt was added into self-doped conductive polymer solution before drying.

Inventive Example 16

A conductive polymer film was prepared, and its conductivity was tested as described in Comparative Example 5, except that 1 wt % of gallic acid was added into self-doped conductive polymer solution before drying.

Inventive Example 17

A conductive polymer film was prepared, and its conductivity was tested as described in Comparative Example 5, except that 1 wt % of tannic acid was added into self-doped conductive polymer solution before drying.

Comparative Example 6

0.5 gram of Self-doped conductive polymer solution, using polymer S2, was dried on a glass slide at 150° C. to make a conductive polymer film. Conductivity of the dried film was measured (Day 0). The conductive polymer film was stored at 150° C. for 7 days and conductivity was read at Days 3 and 7.

Inventive Example 18

A conductive polymer film was prepared as described in Comparative Example 6. 0.1 gram of 5-sulfoisophthalic acid sodium salt 1 wt % aqueous solution was spread on the conductive polymer film and dried at 120° C. Conductivity of the dried film was measured (Day 0). The conductive polymer film was stored at 150° C. for 7 days and conductivity was read at Days 3 and 7.

Inventive Example 19

A conductive polymer film was prepared as described in Inventive Example 18 except that 0.1 gram of anthraquinone-2-sulfonic acid sodium salt 1 wt % aqueous solution was spread on the conductive polymer film and dried at 120° C.

Inventive Example 20

A conductive polymer film was prepared as described in Inventive Example 18 except that 0.1 gram of gallic acid 1 wt % aqueous solution was spread on the conductive polymer film and dried at 120° C.

Inventive Example 21

A conductive polymer film was prepared as described in Inventive Example 18 except that 0.1 gram of tannic acid 1% aqueous solution was spread on the conductive polymer film and dried at 120° C.

Comparative Example 7

A series of 33 microfarads, 35V tantalum anodes with a specific charge of 22,000 µFV/g were prepared. The tantalum was anodized to form a dielectric on the tantalum anode. The anode thus formed was dipped into self-doped conductive polymer solution, using polymer S1, for 1 min and oven dried to remove water. This process was repeated 4 more times. A commercial conductive polymer dispersion KV2 from Heraeus was applied to form an external polymer layer. After drying, alternating layers of a diamine salt and the second conductive polymer dispersion was applied and repeated 4-5 more times. The anodes with the conductive polymer layers were washed in water and dried, followed by sequential coating of a graphite layer and a silver layer to produce a solid electrolytic capacitor. Parts were assembled and packaged. The packaged parts were then mounted on circuit boards. Capacitance and ESR were measured on mounted parts.

Inventive Example 22

A series of Tantalum capacitors were prepared as described in Comparative Example 6, except that after the 5 cycles of the self-doped conductive polymer coating, the anode was dipped in a 40% isopropanol solution of 1-ethyl-3-methylimidazolium bis(trifluoromethylsulfonyl)imide and dried before subsequent process steps.

Comparative Example 8

A series of 68 microfarads, 16V tantalum anodes with a specific charge of 48,000 µFV/g were prepared. The tantalum was anodized to form a dielectric on the tantalum anode. The anode thus formed was dipped into self-doped conductive polymer solution, using polymer S1 containing 0.1% of an epoxy silane, for 1 min and oven dried to remove water. This process was repeated 6-11 more times. A commercial conductive polymer dispersion KV2 from Heraeus was applied to form an external polymer layer. After drying, alternating layers of a diamine salt and the second conductive polymer dispersion was applied and repeated 4-5 more times. The anodes with the conductive polymer layers were washed in water and dried, followed by sequential coating of a graphite layer and a silver layer to produce a solid electrolytic capacitor. Anodes were inspected after washing step for swelling of conductive polymer film and percent of swelled parts were calculated.

Inventive Example 23

A series of tantalum capacitors were prepared as described in Comparative Example 8, except that the self-doped conductive polymer contained 0.1% of an epoxy silane and 0.5% of sulfoacetic acid.

Inventive Example 24

A series of tantalum capacitors were prepared as described in Comparative Example 8, except that the self-doped conductive polymer contained 0.1% of an epoxy silane and 0.5% of 1,5-naphthalene sulfonic acid.

TABLE 1

| Examples | Cap Recovery % | ESR (mΩ) | Power cycling Cap change % | BDV/Vf |
|---|---|---|---|---|
| Comparative 1 | 45.4 | 63.7 | −11.5 | 2.7 |
| Inventive 1 | 57.9 | 57.3 | −1.7 | 3.9 |
| Inventive 2 | 52.4 | 57.2 | −1.0 | 3.2 |

TABLE 2

| Examples | Cap Recovery % | ESR (mΩ) |
|---|---|---|
| Comparative 2 | 36.0% | 120.7 |
| Inventive 3 | 46.4% | 111.3 |
| Inventive 4 | 42.4% | 126.6 |
| Inventive 5 | 43.1% | 164.8 |

TABLE 3

| Examples | Power cycling Cap change % |
|---|---|
| Comparative 3 | −11.8 |
| Inventive 6 | −6.1 |
| Inventive 7 | −7.4 |

TABLE 4

| Examples | Cond. S/cm (Day 0) | Cond. S/cm (Day 1) | Cond. S/cm (Day 6) | Cond. S/cm (Day 9) |
|---|---|---|---|---|
| Comparative 4 | 90.8 | 113.9 | 1.5 | 0.62 |
| Inventive 8 | 32.9 | 62.2 | 17.2 | 4.9 |
| Inventive 9 | 38.4 | 124.5 | 27.8 | 2.3 |
| Inventive 10 | 29.5 | 163.0 | 182.9 | 79.1 |

TABLE 5

| Examples | Cond. S/cm (Day 0) | Cond. S/cm (Day 1) | Cond. S/cm (Day 4) | Cond. S/cm (Day 7) |
|---|---|---|---|---|
| Comparative 5 | 117.2 | 122.0 | 8.9 | 0.25 |
| Inventive 11 | 92.1 | 103.7 | 38.9 | 12.7 |
| Inventive 12 | 47.3 | 102.7 | 56.0 | 19.9 |
| Inventive 13 | 10.7 | 56.3 | 72.1 | 44.5 |
| Inventive 14 | 26.2 | 93.7 | 66.7 | 43.7 |
| Inventive 15 | 35.4 | 86.9 | 48.8 | 38.8 |
| Inventive 16 | 4.52 | 18.5 | 10.5 | 4.83 |
| Inventive 17 | 2.09 | 9.34 | 7.30 | 5.06 |

TABLE 6

| Examples | Cond. S/cm (Day 0) | Cond. S/cm (Day 3) | Cond. S/cm (Day 7) |
|---|---|---|---|
| Comparative 6 | 112.5 | 19.5 | 0.77 |
| Inventive 18 | 58.8 | 44.1 | 7.1 |
| Inventive 19 | 54.7 | 61.3 | 15.7 |
| Inventive 20 | 23.0 | 32.7 | 2.5 |
| Inventive 21 | 59.4 | 36.1 | 2.6 |

TABLE 7

| Examples | Capacitance (μF) | ESR (mΩ) |
|---|---|---|
| Comparative 7 | 23.8 | 67.1 |
| Inventive 22 | 31.8 | 71.9 |

TABLE 8

| Examples | % Swelled Parts |
|---|---|
| Comparative Example 8 | 18.8% |
| Inventive Example 22 | 0.5% |
| Inventive Example 23 | 4.5% |

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A process for forming an electrolytic capacitor comprising:
   forming an anode comprising a dielectric on said anode;
   forming a cathode layer on said dielectric wherein said cathode layer comprises a self-doped conductive polymer and a cross-linker wherein a weight ratio of said crosslinker to said self-doped conductive polymer is at least 0.01 to no more than 2.

2. The process for forming an electrolytic capacitor of claim 1 wherein said weight ratio of said crosslinker to said self-doped conductive polymer is at least 0.02 to no more than 1.

3. The process for forming an electrolytic capacitor of claim 2 wherein said weight ratio of said crosslinker to said self-doped conductive polymer is at least 0.05 to no more than 0.2.

4. The process for forming an electrolytic capacitor of claim 1 wherein said cathode layer further comprises a crosslinkable material.

5. The process for forming an electrolytic capacitor of claim 4 wherein said crosslinkable material comprises at least one oligomer or polymer selected from the group consisting of polyester, polyurethane, polyamide, polyamine, polyimide, silicone polyester, hydroxyl functional silicone, hydroxyethyl cellulose, polyvinyl alcohol, phenolic, epoxy, butyral, copolymers of these or mixture of these multifunctional polymers such as epoxy/amine, epoxy/anhydride, isocyanate/amine, isocyanate/alcohol, unsaturated polyesters, vinyl esters, unsaturated polyester and vinyl ester blends, unsaturated polyester/urethane hybrid resins, polyurethane-ureas, reactive dicyclopentadiene resins or reactive polyamides.

6. The process for forming an electrolytic capacitor of claim 4 wherein said crosslinkable material is crosslinked by said crosslinker.

7. The process for forming an electrolytic capacitor of claim 4 wherein said crosslinkable material is crosslinked to said self-doped conductive polymer by said crosslinker.

8. The process for forming an electrolytic capacitor of claim 4 wherein said crosslinkable material comprises at least one reactive group capable of reacting with said crosslinker.

9. The process for forming an electrolytic capacitor of claim 8 wherein said reactive group is selected from the group consisting of carboxylic, hydroxyl, amine, epoxy, anhydride, isocyanate, imide, amide, carboxyl, carboxylic anhydride, silane, oxazoline, (meth)acrylates, vinyls, maleates, maleimides, itaconates, allyl alcohol esters, dicyclo-pentadiene-based unsaturations, unsaturated $C_{12}$-$C_{22}$ fatty esters or amides, carboxylic acid salts and quaternary ammonium salts.

10. The process for forming an electrolytic capacitor of claim 4 wherein said crosslinkable material comprises a polyol.

11. The process for forming an electrolytic capacitor of claim 10 wherein said polyol is selected from ethylene glycol and polyglycerol.

12. The process for forming an electrolytic capacitor of claim 1 wherein said self-doped conductive polymer is crosslinked by said crosslinker.

13. The process for forming an electrolytic capacitor of claim 1 wherein said crosslinker is selected from the group consisting of melamines, isocyanates, epoxies, hexamethoxymelamines, glyoxals, furfural aldehydes, melamine formaldehyde condensates, divinyl sulfones, epoxy compounds, organofunctional silanes and carboxylic compounds.

14. The process for forming an electrolytic capacitor of claim 13 wherein said crosslinker comprises more than one epoxy group.

15. The process for forming an electrolytic capacitor of claim 13 wherein said organofunctional silane is defined by the formula:

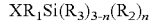

wherein:
X is an organic functional group selected from the group consisting of amino, epoxy, anhydride, hydroxy, mercapto, sulfonate, carboxylate, phosphonate, halogen, vinyl, methacryloxy, ester and alkyl;
$R_1$ is an aryl or alkyl of up to 14 carbons;
each $R_2$ is individually a hydrolysable functional group;
each $R_3$ is individually an alkyl functional group of 1-6 carbons; and
n is 1 to 3.

16. The process for forming an electrolytic capacitor of claim 15 wherein said hydrolysable functional group is selected from the group consisting of alkoxy, acyloxy, halogen, amine and their hydrolyzed product.

17. The process for forming an electrolytic capacitor of claim 13 wherein said organofunctional silane is defined by the formula:

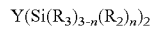

wherein:
Y is an organic moiety that contains reactive or nonreactive functional groups;
each $R_2$ is individually a hydrolysable functional group;
each $R_3$ is individually an alkyl functional group of 1-6 carbons; and
n is 1 to 3.

18. The process for forming an electrolytic capacitor of claim 17 wherein said reactive or nonreactive functional groups is selected from the group consisting of alkyl, aryl, sulfide and melamine.

19. The process for forming an electrolytic capacitor of claim 13 wherein said organofunctional silane is selected from the group consisting of 3-glycidoxypropyltrimethoxysilane, 3-aminopropyltriethoxysilane, aminopropylsilanetriol, (triethoxysilyl)propylsuccinic anhydride, 3-mercaptopropyltrimethoxysilane, vinyltrimethoxysilane, 3-methacryloxypropyltrimethoxysilane, 3-trihydroxysilyl-1-propane sulfonic acid, octyltriethyoxysilane and bis(triethoxysilyl)octane.

20. The process for forming an electrolytic capacitor of claim 13 wherein said organofunctional silane is selected from the group consisting of:

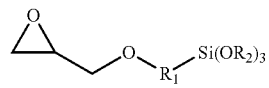

wherein $R_1$ is an alkyl of 1 to 14 carbons; and
each $R_2$ is independently an alkyl or substituted alkyl of 1 to 6 carbons;

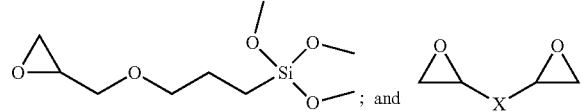

wherein:
X is an alkyl or substituted alkyl of up to 14 carbons, an aryl or substituted aryl, an ethylene ether or substituted ethylene ether, polyethylene ether or substituted polyethylene ether with 2-20 ethylene ether groups or combinations thereof.

21. The process for forming an electrolytic capacitor of claim 13 wherein said crosslinker is selected from the group consisting of ethylene glycol diglycidyl ether, propylene glycol diglycidyl ether, 1,4-butanediol diglycidyl ether, pentylene glycol diglycidyl ether, hexylene glycol diglycidyl ether, cyclohexane dimethanol diglycidyl ether, resorcinol glycidyl ether, glycerol diglycidyl ether, glycerol polyglycidyl ethers, diglycerol polyglycidyl ethers, trimethylolpropane polyglycidyl ethers, sorbitol diglycidyl ether, sorbitol polyglycidyl ethers, polyethylene glycol diglycidyl ether, polypropylene glycol diglycidyl ether, polytetramethylene glycol diglycidyl ether, di(2,3-epoxypropyl)ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether and maleimide-epoxy compounds.

22. The process for forming an electrolytic capacitor of claim 13 wherein said crosslinker is defined by:

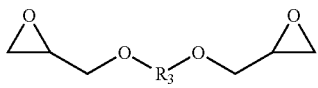

wherein $R_3$ is an alkyl or substituted alkyl of 1-14 carbons, an ethylene ether or polyethylene ether with 2-20 ethylene ether groups, an alkyl substituted with a group selected from hydroxy and

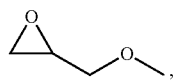

or —$(CH_2OH)_xCH_2OH$ wherein X is 1 to 14.

23. The process for forming an electrolytic capacitor of claim 13 wherein said crosslinker is defined by:

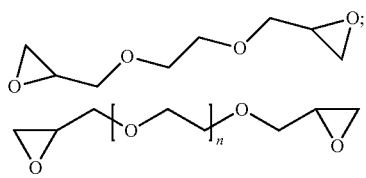

where n is an integer of 1 to 220;

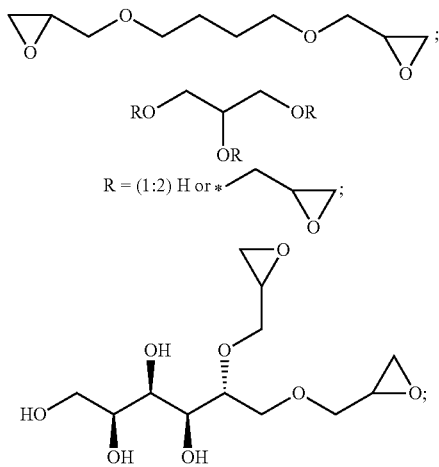

or sorbitol diglycidyl ether.

24. The process for forming an electrolytic capacitor of claim 13 wherein said crosslinker is selected from the group consisting of oxalic acid, malonic acid, succinic acid, glutaric acid, adipic acid, pimelic acid, suberic acid, azelaic acid, sebacic acid, dodecanedioic acid, phthalic acids, maleic acid, muconic acid, citric acid, trimesic acid and polyacrylic acid.

25. The process for forming an electrolytic capacitor of claim 24 wherein said crosslinker is selected from the group consisting of phthalic acid, and ortho-phthalic acid.

26. The process for forming an electrolytic capacitor of claim 1 wherein said self-doped conductive polymer is defined by

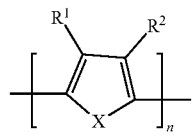

wherein:
$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements;
$R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl with the proviso that at least one of $R^1$ or $R^2$ is substituted with —$SO_3M$, —$CO_2M$ or —$PO_3M$ wherein M is H or a cation preferably selected from ammonium, sodium, lithium or potassium; and
X is S, N or O.

27. The process for forming an electrolytic capacitor of claim 26 wherein $R^1$ and $R^2$ are taken together to represent —O—$(CHR^4)_n$—O— wherein:
n is an integer from 1 to 5 and most preferably 2;
$R^4$ is independently selected from a linear or branched $C_1$ to $C_{18}$ alkyl radical $C_5$ to $C_{12}$ cycloalkyl radical, $C_6$ to $C_{14}$ aryl radical Cr to $C_1$ aralkyl radical or $C_1$ to $C_4$ hydroxyalkyl radical, wherein $R^4$ is substituted with —$SO_3M$, —$CO_2M$ or —$PO_3M$ and optionally substituted with at least one additional functional group selected from carboxylic acid, hydroxyl, amine, substituted amines, alkene, acrylate, thiol, alkyne, azide, sulfate, sulfonate, sulfonic acid, imide, amide, epoxy, anhydride, silane, and phosphate; hydroxyl radical; or $R^1$ is selected from —$(CHR^5)_a$—$R^{16}$; —$O(CHR^5)_aR^{16}$; —$CH_2O(CHR^5)_aR^{16}$; —$CH_2O(CH_2CHR^5O)_aR^{16}$, or $R^4$ is —$SO_3M$, —$CO_2M$ or —$PO_3M$;
$R^5$ is H or alkyl chain of 1 to 5 carbons optionally substituted with functional groups selected from carboxylic acid, hydroxyl, amine, alkene, thiol, alkyne, azide, epoxy, acrylate and anhydride;
$R^{16}$ is —$SO_3M$, —$CO_2M$ or —$PO_3M$ or an alkyl chain of 1 to 5 carbons substituted with —$SO_3M$, —$CO_2M$ or —$PO_3M$ and optionally further substituted with at least one functional group selected from carboxylic acid, hydroxyl, amine, substituted amines, alkene, thiol, alkyne, azide, amide, imide, sulfate, amide, epoxy, anhydride, silane, acrylate and phosphate;
a is integer from 0 to 10; and
M is a H or cation preferably selected from ammonium, sodium, lithium or potassium.

28. The process for forming an electrolytic capacitor of claim 26 wherein said self-doped conductive polymers is selected from the group consisting of S1 and S2:

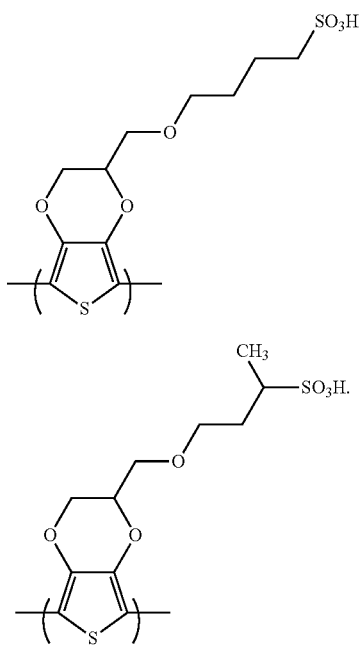

29. The process for forming an electrolytic capacitor of claim 1 wherein said cathode layer further comprises a foreign dopant wherein said foreign dopant is present in an amount of 7 to 100 wt % based on a weight of said self-doped conductive polymer.

30. The process for forming an electrolytic capacitor of claim 29 wherein said foreign dopant is present in an amount of 8 to 20 wt % based on said weight of said self-doped conductive polymer.

31. The process for forming an electrolytic capacitor of claim 29 wherein said foreign dopant is defined by:

$A_xB_yC_z$ wherein:
A is polystyrenesulfonic acid or salt of polystyrenesulfonate;
B and C separately represent polymerized units substituted with a group selected from:
-carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
R$^7$ is selected from a hydrogen or an alkyl of 1 to 7 carbons;
b is an integer from 1 to the number sufficient to provide a molecular weight of up to 200,000 for the —CHR$^7$CH$_2$O— group; and
R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^{10}$ wherein:
R$^{10}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and
—(O(CHR$^{11}$CH$_2$O)$_d$—R$^{12}$ wherein:
R$^{11}$ is a hydrogen or an alkyl of 1 to 7 carbons and preferably hydrogen or methyl;
d is an integer from 1 to the number sufficient to provide a molecular weight of up to 200,000 for the —CHR$^{11}$CH$_2$O— group;
R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
R$^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—(CHR$^{14}$CH$_2$O)$_e$—R$^{15}$ wherein:
R$^{14}$ is a hydrogen or an alkyl of 1 to 7 carbons;
e is an integer from 1 to the number sufficient to provide a molecular weight of up to 200,000 for the —CHR$^{14}$CH$_2$O— group; and
R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride; and
y and z are 0 or x, y and z, taken together are sufficient to form a polyanion with a molecular weight of at least 100 to no more than 500,000 and y/x is 0.01 to 100 or z is 0 to a ratio z/x of no more than 100.

32. The process for forming an electrolytic capacitor of claim 31 wherein R$^7$ is hydrogen or methyl.

33. The process for forming an electrolytic capacitor of claim 31 wherein R$^{14}$ is hydrogen or methyl.

34. The process for forming an electrolytic capacitor of claim 31 wherein x represents 50-99%, y represents 1 to 50% and z represents 0 to 49% of the sum total of x+y+z.

35. The process for forming an electrolytic capacitor of claim 34 wherein x represents 70-90%; y represents 10 to 30% and z represents 0 to 20% of the sum total of x+y+z.

36. The process for forming an electrolytic capacitor of claim 1 wherein said cathode layer further comprises an aromatic compound that contain at least one hydroxy functionality and at least another hydroxy or a carboxylic functionality.

37. The process for forming an electrolytic capacitor of claim 36 wherein said aromatic compound is a phenolic acid.

38. The process for forming an electrolytic capacitor of claim 37 wherein said phenolic acid is selected from the group consisting of gallic acid and tannic acid.

39. The process for forming an electrolytic capacitor of claim 1 wherein said cathode layer further comprises a functional additive.

40. The process for forming an electrolytic capacitor of claim 39 wherein a weight ratio of said functional additive to said self-doped conductive polymer is 0.05 to 5.

41. The process for forming an electrolytic capacitor of claim 40 wherein said weight ratio of said functional additive to said self-doped conductive polymer is 0.5 to 1.

42. The process for forming an electrolytic capacitor of claim 39 wherein said functional additive is selected from the group consisting of ionic liquid, non-ionic polyol, and polyalkylene ether.

43. The process for forming an electrolytic capacitor of claim 42 wherein said non-ionic polyol is polyglycerol.

44. The process for forming an electrolytic capacitor of claim 42 wherein said ionic liquid is selected from the group consisting of:

Cationic PILs

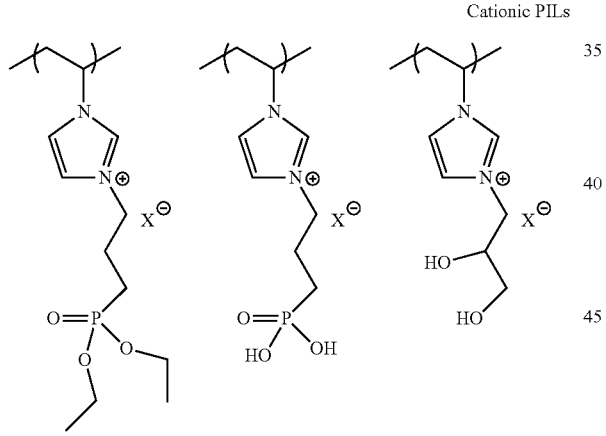

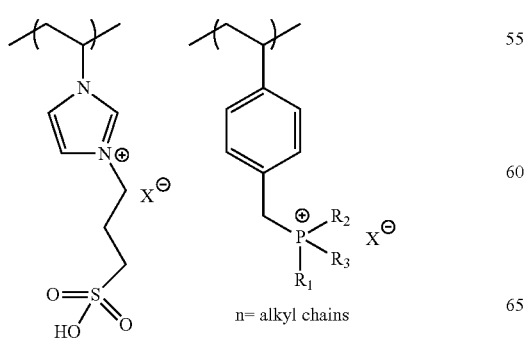

-continued

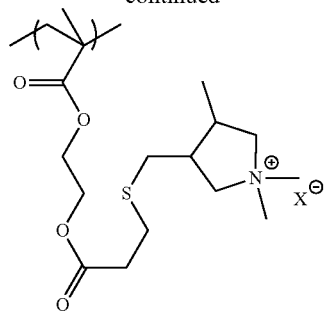

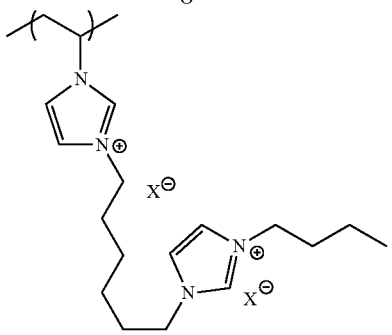

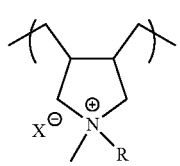

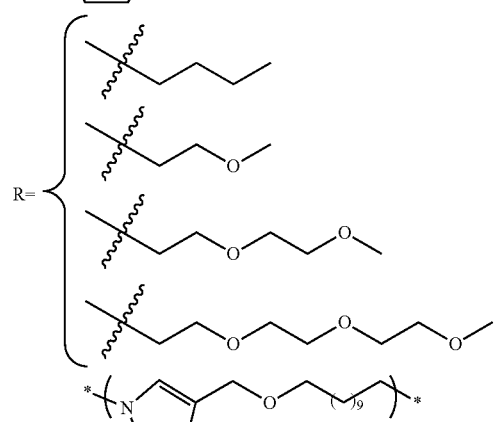

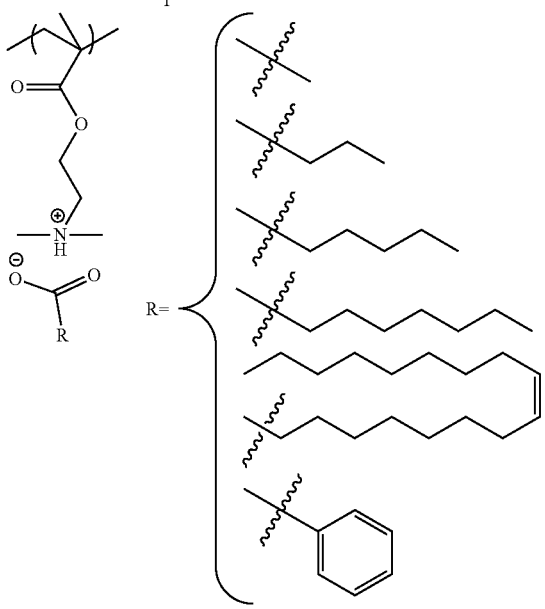

-continued

Anionic PILs

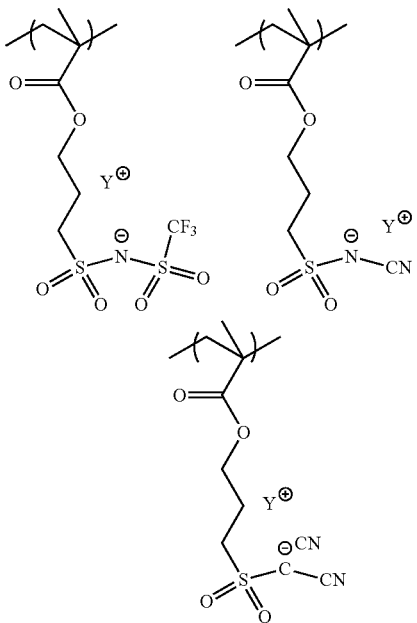

4-(3-Butyl-1-imidazolio)-1-butanesulfonic acid triflate, 1-Butyl-3-methylimidazolium octyl sulfate, 1-Butyl-3-methylimidazolium trifluoromethanesulfonate, 1-Ethyl-3-methylimidazolium trifluoromethanesulfonate, 1-Ethyl-3-methylimidazolium bis(trifluoromethylsulfonyl)imide, 1-Allyl-3-methylimidazolium bis(trifluoromethylsulfonyl)imide, 1-(2-Hydroxyethyl)-3-methylimidazolium bis(trifluoromethylsulfonyl)imide, 1-ethyl-3-methylimidazolium tetrafluoroborate, Bis(trifluoromethane)sulfonimide lithium and derivatives thereof.

45. The process for forming an electrolytic capacitor of claim 42 wherein said non-ionic polyol has an alkyl or alkyl ether of 3-20 carbons, either linear, branched or in rings, with at least two carbons each substituted with at least one hydroxyl group.

46. The process for forming an electrolytic capacitor of claim 42 wherein said non-ionic polyol is selected from the group consisting of erythritol, ribitol, xylitol, pentaerythritol, 2,2-dimethyl-1,3-propanediol; sorbitol, manitol, trimethylolethane, di-trimethylolpropane, glucose, fructose, sucrose and lactose, glycerol, diglycerol, triglycerol, tetraglycerol, polyglycerols.

47. The process for forming an electrolytic capacitor of claim 42 wherein said polyalkylene ether is selected from the group consisting of polyalkylene glycols, polyepichlorohydrins, polyoxetanes, polyphenylene ethers and polyether ketones.

48. The process for forming an electrolytic capacitor of claim 47 wherein said polyalkylene ether is selected from the group consisting of polyethylene glycols, polypropylene glycols and polytetramethylene glycols.

49. The process for forming an electrolytic capacitor of claim 39 wherein said functional additive is selected from the group consisting of ethoxylated alkylphenols; ethoxylated or propoxylated $C_6$-$C_{24}$ fatty alcohols; polyoxyethylene glycol alkyl ethers having the general formula: $CH_3$—$(CH_2)_{10\text{-}16}$—$(O$—$C_2H_4)_{1\text{-}25}$—$OH$, polyoxypropylene glycol alkyl ethers having the general formula: $CH_3$—$(CH_2)_{10\text{-}16}$—$(O$—$C_3H_6)_{1\text{-}25}$—$OH$; polyoxyethylene glycol octylphenol ethers having the following general formula: $C_8$—$H_{17}$—$(C_6H_4)$—$(O$—$C_2H_4)_{1\text{-}25}$—$OH$; polyoxyethylene glycol alkylphenol ethers having the following general formula: $C_9$—$H_{19}$—$(C_6H_4)$—$(O$—$C_2H_4)_{1\text{-}25}$—$OH$, polyoxyethylene glycol esters of $C_8$-$C_{24}$ fatty acids, and polyoxyethylene glycerol alkyl esters, polyoxyethylene glycol ethers of $C_8$-$C_{24}$ fatty acids (and block copolymers of polyethylene glycol.

50. The process for forming an electrolytic capacitor of claim 49 wherein said functional additive is selected from the group consisting of octaethylene glycol monododecyl ether, pentaethylene glycol monododecyl ether, nonoxynol-9, polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, PEG-20 castor oil, PEG-3 castor oil, PEG 600 dioleate, PEG 400 dioleate, polyoxyethylene-23 glycerol laurate, polyoxyethylene-20 glycerol stearate, polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether and polyoxyethylene-6 tridecyl ether.

51. The process for forming an electrolytic capacitor of claim 1 wherein said self-doped conductive polymer is polymerized in the presence of at least one of a foreign dopant or a functional additive.

52. An electrolytic capacitor comprising:
an anode comprising a dielectric on said anode;
a cathode layer on said dielectric wherein said cathode layer comprises a cross-linked self-doped conductive polymer formed by a cross-linker wherein said cathode has a weight ratio of said crosslinker to said self-doped conductive polymer of at least 0.01 to no more than 2.

53. The electrolytic capacitor of claim 52 wherein said weight ratio of said crosslinker to said self-doped conductive polymer is at least 0.02 to no more than 1.

54. The electrolytic capacitor of claim 53 wherein said weight ratio of said crosslinker to said self-doped conductive polymer is at least 0.05 to no more than 0.2.

55. The electrolytic capacitor of claim 52 wherein said cathode layer further comprises a crosslinkable material.

56. The electrolytic capacitor of claim 55 wherein said crosslinkable material comprises at least one oligomer or polymer selected from the group consisting of polyester, polyurethane, polyamide, polyamine, polyimide, silicone polyester, hydroxyl functional silicone, hydroxyethyl cellulose, polyvinyl alcohol, phenolic, epoxy, butyral, copolymers of these or mixture of these multifunctional polymers such as epoxy/amine, epoxy/anhydride, isocyanate/amine, isocyanate/alcohol, unsaturated polyesters, vinyl esters, unsaturated polyester and vinyl ester blends, unsaturated polyester/urethane hybrid resins, polyurethane-ureas, reactive dicyclopentadiene resins or reactive polyamides.

57. The electrolytic capacitor of claim 55 wherein said crosslinkable material is crosslinked by said crosslinker.

58. The electrolytic capacitor of claim 55 wherein said crosslinkable material is crosslinked to said self-doped conductive polymer by said crosslinker.

59. The electrolytic capacitor of claim 55 wherein said crosslinkable material comprises at least one reactive group capable of reacting with said crosslinker.

60. The electrolytic capacitor of claim 59 wherein said reactive group is selected from the group consisting of carboxylic, hydroxyl, amine, epoxy, anhydride, isocyanate, imide, amide, carboxyl, carboxylic anhydride, silane, oxazoline, (meth)acrylates, vinyls, maleates, maleimides, itaconates, allyl alcohol esters, dicyclo-pentadiene-based unsaturations, unsaturated $C_{12}$-$C_{22}$ fatty esters or amides, carboxylic acid salts and quaternary ammonium salts.

61. The electrolytic capacitor of claim 55 wherein said crosslinkable material comprises a polyol.

62. The electrolytic capacitor of claim 61 wherein said polyol is selected from ethylene glycol and polyglycerol.

63. The electrolytic capacitor of claim 52 wherein said self-doped conductive polymer is crosslinked by said crosslinker.

64. The electrolytic capacitor of claim 52 wherein said crosslinker is selected from the group consisting of melamines, isocyanates, epoxies, hexamethoxymelamines, glyoxals, furfural aldehydes, melamine formaldehyde condensates, divinyl sulfones, epoxy compounds, organofunctional silanes and carboxylic compounds.

65. The electrolytic capacitor of claim 64 wherein said crosslinker comprises more than one epoxy group.

66. The electrolytic capacitor of claim 64 wherein said organofunctional silane is defined by the formula:

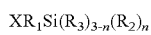

wherein:
X is an organic functional group selected from the group consisting of amino, epoxy, anhydride, hydroxy, mercapto, sulfonate, carboxylate, phosphonate, halogen, vinyl, methacryloxy, ester and alkyl;
$R_1$ is an aryl or alkyl of up to 14 carbons;
each $R_2$ is individually a hydrolysable functional group;
each $R_3$ is individually an alkyl functional group of 1-6 carbons; and
n is 1 to 3.

67. The electrolytic capacitor of claim 66 wherein said hydrolysable functional group is selected from the group consisting of alkoxy, acyloxy, halogen, amine and their hydrolyzed product.

68. The electrolytic capacitor of claim 64 wherein said organofunctional silane is defined by the formula:

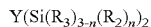

wherein:
Y is an organic moiety that contains reactive or nonreactive functional groups;
each $R_2$ is individually a hydrolysable functional group;
each $R_3$ is individually an alkyl functional group of 1-6 carbons; and
n is 1 to 3.

69. The electrolytic capacitor of claim 68 wherein said reactive or nonreactive functional groups is selected from the group consisting of alkyl, aryl, sulfide and melamine.

70. The electrolytic capacitor of claim 64 wherein said organofunctional silane is selected from the group consisting of 3-glycidoxypropyltrimethoxysilane, 3-aminopropyltriethoxysilane, aminopropylsilanetriol, (triethoxysilyl)propylsuccinic anhydride, 3-mercaptopropyltrimethoxysilane, vinyltrimethoxysilane, 3-methacryloxypropyltrimethoxysilane, 3-trihydroxysilyl-1-propane sulfonic acid, octyltriethyoxysilane and bis(triethoxysilyl)octane.

71. The electrolytic capacitor of claim 64 wherein said organofunctional silane is selected from the group consisting of:

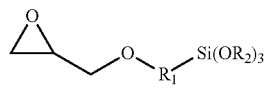

wherein $R_1$ is an alkyl of 1 to 14 carbons; and each $R_2$ is independently an alkyl or substituted alkyl of 1 to 6 carbons;

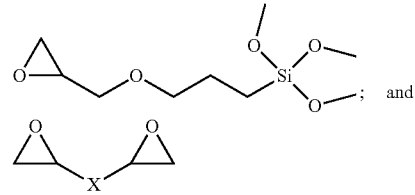

wherein:
X is an alkyl or substituted alkyl of up to 14 carbons, an aryl or substituted aryl, an ethylene ether or substituted ethylene ether, polyethylene ether or substituted polyethylene ether with 2-20 ethylene ether groups or combinations thereof.

72. The electrolytic capacitor of claim 64 wherein said crosslinker is selected from the group consisting of ethylene glycol diglycidyl ether, propylene glycol diglycidyl ether, 1,4-butanediol diglycidyl ether, pentylene glycol diglycidyl ether, hexylene glycol diglycidyl ether, cyclohexane dimethanol diglycidyl ether, resorcinol glycidyl ether, glycerol diglycidyl ether, glycerol polyglycidyl ethers, diglycerol polyglycidyl ethers, trimethylolpropane polyglycidyl ethers, sorbitol diglycidyl ether, sorbitol polyglycidyl ethers, polyethylene glycol diglycidyl ether, polypropylene glycol diglycidyl ether, polytetramethylene glycol diglycidyl ether, di(2,3-epoxypropyl)ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether and maleimide-epoxy compounds.

73. The electrolytic capacitor of claim 64 wherein said crosslinker is defined by:

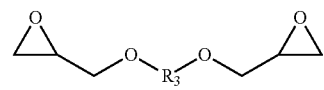

wherein $R_3$ is an alkyl or substituted alkyl of 1-14 carbons, an ethylene ether or polyethylene ether with 2-20 ethylene ether groups, an alkyl substituted with a group selected from hydroxy and

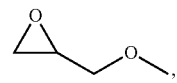

or —$(CH_2OH)_xCH_2OH$ wherein X is 1 to 14.

74. The electrolytic capacitor of claim 64 wherein said crosslinker is defined by:

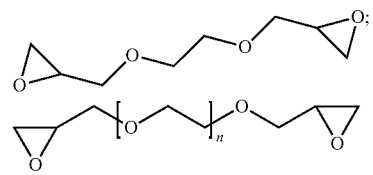

where n is an integer of 1 to 220;

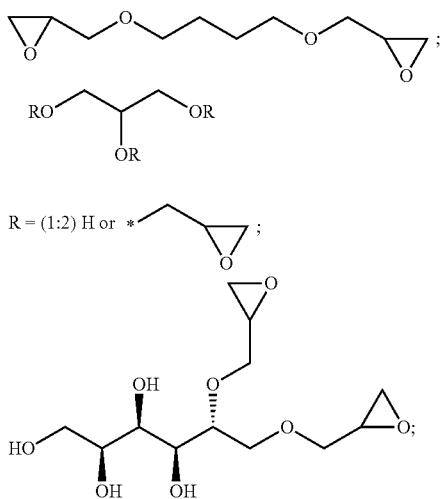

R = (1:2) H or * sorbitol diglycidyl ether.

75. The electrolytic capacitor of claim 64 wherein said crosslinker is selected from the group consisting of oxalic acid, malonic acid, succinic acid, glutaric acid, adipic acid, pimelic acid, suberic acid, azelaic acid, sebacic acid, dodecanedioic acid, phthalic acids, maleic acid, muconic acid, citric acid, trimesic acid and polyacrylic acid.

76. The electrolytic capacitor of claim 75 wherein said crosslinker is selected from the group consisting of phthalic acid, and ortho-phthalic acid.

77. The electrolytic capacitor of claim 52 wherein said self-doped conductive polymer is defined by

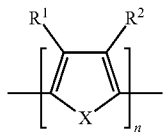

wherein:
R$^1$ and R$^2$ independently represent linear or branched C$_1$-C$_{16}$ alkyl or C$_2$-C$_{18}$ alkoxyalkyl; or are C$_3$-C$_8$ cycloalkyl, phenyl or benzyl which are unsubstituted or substituted by C$_1$-C$_6$ alkyl, C$_1$-C$_6$ alkoxy, halogen or OR$^3$; or R$^1$ and R$^2$, taken together, are linear C$_1$-C$_6$ alkylene which is unsubstituted or substituted by C$_1$-C$_6$ alkyl, C$_1$-C$_6$ alkoxy, halogen, C$_3$-C$_8$ cycloalkyl, phenyl, benzyl, C$_1$-C$_4$ alkylphenyl, C$_1$-C$_4$ alkoxyphenyl, halophenyl, C$_1$-C$_4$ alkylbenzyl, C$_1$-C$_4$ alkoxybenzyl or halobenzyl, 5-, 6-, or 7-membered heterocyclic structure containing two oxygen elements;
R$^3$ preferably represents hydrogen, linear or branched C$_1$-C$_{16}$ alkyl or C$_2$-C$_{18}$ alkoxyalkyl; or are C$_3$-C$_8$ cycloalkyl, phenyl or benzyl which are unsubstituted or substituted by C$_1$-C$_6$ alkyl with the proviso that at least one of R$^1$ or R$^2$ is substituted with —SO$_3$M, —CO$_2$M or —PO$_3$M wherein M is H or a cation preferably selected from ammonium, sodium, lithium or potassium; and
X is S, N or O.

78. The electrolytic capacitor of claim 77 wherein R$^1$ and R$^2$ are taken together to represent —O—(CHR$^4$)$_n$—O— wherein:

n is an integer from 1 to 5 and most preferably 2;
R$^4$ is independently selected from a linear or branched C$_1$ to C$_{18}$ alkyl radical C$_5$ to C$_{12}$ cycloalkyl radical, C$_6$ to C$_{14}$ aryl radical Cr to C$_1$ aralkyl radical or C$_1$ to C$_4$ hydroxyalkyl radical, wherein R$^4$ is substituted with —SO$_3$M, —CO$_2$M or —PO$_3$M and optionally substituted with at least one additional functional group selected from carboxylic acid, hydroxyl, amine, substituted amines, alkene, acrylate, thiol, alkyne, azide, sulfate, sulfonate, sulfonic acid, imide, amide, epoxy, anhydride, silane, and phosphate; hydroxyl radical; or
R$^1$ is selected from —(CHR$^5$)$_a$—R$^{16}$; —O(CHR$^5$)$_a$R$^{16}$; —CH$_2$O(CHR$^5$)$_a$R$^{16}$; —CH$_2$O(CH$_2$CHR$^5$O)$_a$R$^{16}$, or R$^4$ is —SO$_3$M, —CO$_2$M or —PO$_3$M;
R$^5$ is H or alkyl chain of 1 to 5 carbons optionally substituted with functional groups selected from carboxylic acid, hydroxyl, amine, alkene, thiol, alkyne, azide, epoxy, acrylate and anhydride;
R$^{16}$ is —SO$_3$M, —CO$_2$M or —PO$_3$M or an alkyl chain of 1 to 5 carbons substituted with —SO$_3$M, —CO$_2$M or —PO$_3$M and optionally further substituted with at least one functional group selected from carboxylic acid, hydroxyl, amine, substituted amines, alkene, thiol, alkyne, azide, amide, imide, sulfate, amide, epoxy, anhydride, silane, acrylate and phosphate;
a is integer from 0 to 10; and
M is a H or cation preferably selected from ammonium, sodium, lithium or potassium.

79. The electrolytic capacitor of claim 77 wherein said self-doped conductive polymers is selected from the group consisting of S1 and S2:

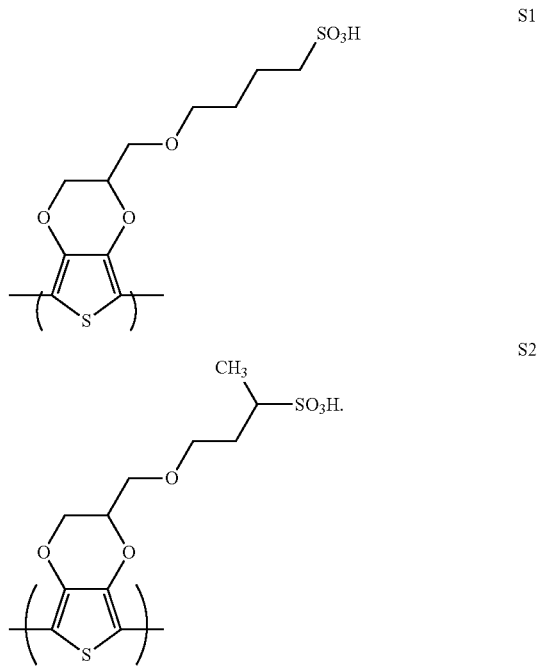

80. The electrolytic capacitor of claim 52 wherein said cathode layer further comprises a foreign dopant wherein said foreign dopant is present in an amount of 7 to 100 wt % based on a weight of said self-doped conductive polymer.

81. The electrolytic capacitor of claim 80 wherein said foreign dopant is present in an amount of 8 to 20 wt % based on said weight of said self-doped conductive polymer.

82. The electrolytic capacitor of claim 80 wherein said foreign dopant is defined by:

$A_xB_yC_z$ wherein:
A is polystyrenesulfonic acid or salt of polystyrenesulfonate;
B and C separately represent polymerized units substituted with a group selected from:
-carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
R$^7$ is selected from a hydrogen or an alkyl of 1 to 7 carbons;
b is an integer from 1 to the number sufficient to provide a molecular weight of up to 200,000 for the —CHR$^7$CH$_2$O— group; and
R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^{10}$ wherein:
R$^{10}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and
—(O(CHR$^{11}$CH$_2$O)$_d$—R$^{12}$ wherein:
R$^{11}$ is a hydrogen or an alkyl of 1 to 7 carbons and preferably hydrogen or methyl;
d is an integer from 1 to the number sufficient to provide a molecular weight of up to 200,000 for the —CHR$^{11}$CH$_2$O— group;
R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
R$^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and —(CHR$^{14}$CH$_2$O)$_e$—R$^{15}$ wherein:
R$^{14}$ is a hydrogen or an alkyl of 1 to 7 carbons;
e is an integer from 1 to the number sufficient to provide a molecular weight of up to 200,000 for the —CHR$^{14}$CH$_2$O— group; and
R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride; and
y and z are 0 or x, y and z, taken together are sufficient to form a polyanion with a molecular weight of at least 100 to no more than 500,000 and y/x is 0.01 to 100 or z is 0 to a ratio z/x of no more than 100.

83. The electrolytic capacitor of claim 82 wherein R$^7$ is hydrogen or methyl.

84. The electrolytic capacitor of claim 82 wherein R$^{14}$ is hydrogen or methyl.

85. The electrolytic capacitor of claim 82 wherein x represents 50-99%, y represents 1 to 50% and z represents 0 to 49% of the sum total of x+y+z.

86. The electrolytic capacitor of claim 85 wherein x represents 70-90%; y represents 10 to 30% and z represents 0 to 20% of the sum total of x+y+z.

87. The electrolytic capacitor of claim 52 wherein said cathode layer further comprises an aromatic compound that contain at least one hydroxy functionality and at least another hydroxy or a carboxylic functionality.

88. The electrolytic capacitor of claim 87 wherein said aromatic compound is a phenolic acid.

89. The electrolytic capacitor of claim 88 wherein said phenolic acid is selected from the group consisting of gallic acid and tannic acid.

90. The electrolytic capacitor of claim 52 wherein said cathode layer further comprises a functional additive.

91. The electrolytic capacitor of claim 90 wherein a weight ratio of said functional additive to said self-doped conductive polymer is 0.05 to 5.

92. The electrolytic capacitor of claim 91 wherein said weight ratio of said functional additive to said self-doped conductive polymer is 0.5 to 1.

93. The electrolytic capacitor of claim 90 wherein said functional additive is selected from the group consisting of ionic liquid, non-ionic polyol, and polyalkylene ether.

94. The electrolytic capacitor of claim 93 wherein said ionic liquid is selected from the group consisting of:

Cationic PILs

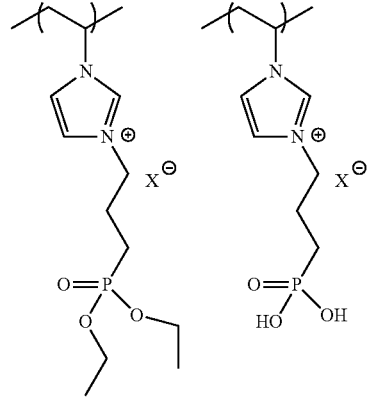

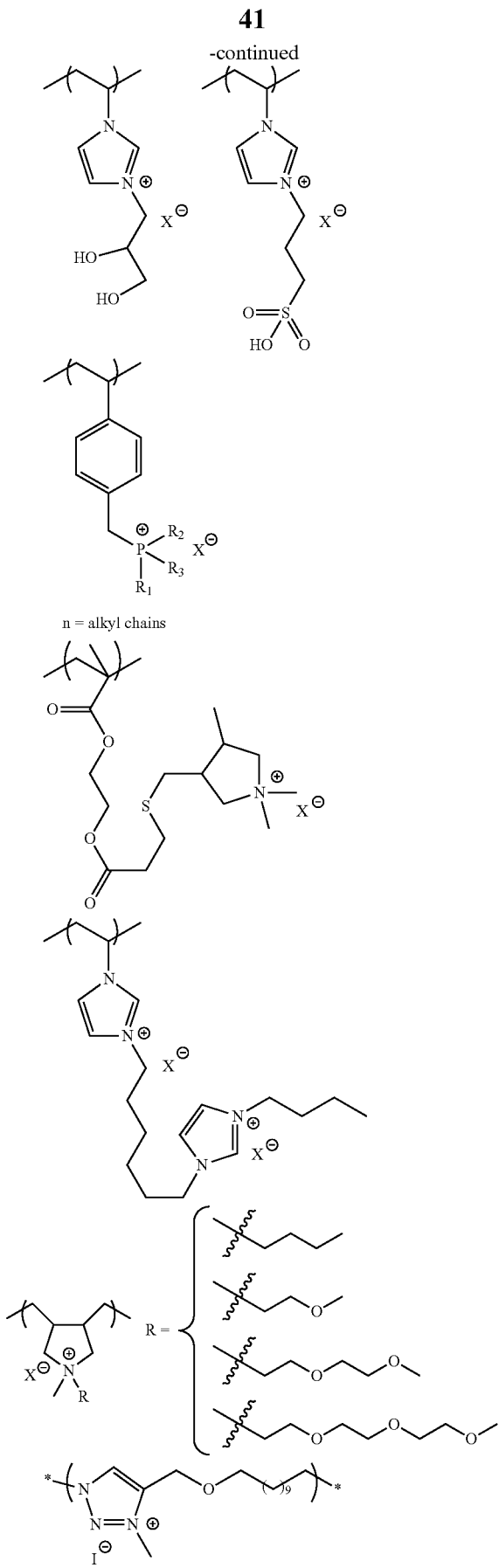

n = alkyl chains

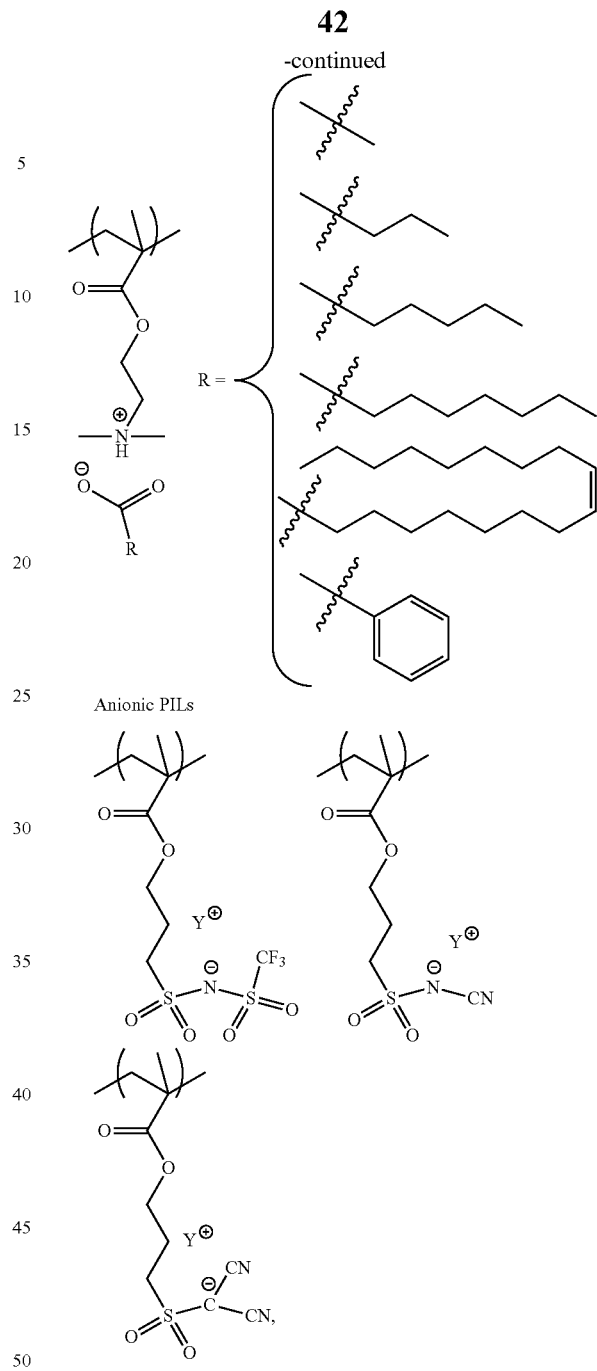

Anionic PILs 4-(3-Butyl-1-imidazolio)-1-butanesulfonic acid triflate, 1-Butyl-3-methylimidazolium octyl sulfate, 1-Butyl-3-methylimidazolium trifluoromethanesulfonate, 1-Ethyl-3-methylimidazolium trifluoromethanesulfonate, 1-Ethyl-3-methylimidazolium bis(trifluoromethylsulfonyl)imide, 1-Allyl-3-methylimidazolium bis(trifluoromethylsulfonyl)imide, 1-(2-Hydroxyethyl)-3-methylimidazolium bis(trifluoromethylsulfonyl)imide, 1-ethyl-3-methylimidazolium tetrafluoroborate, Bis(trifluoromethane)sulfonimide lithium and derivatives thereof.

95. The electrolytic capacitor of claim 93 wherein said non-ionic polyol has an alkyl or alkyl ether of 3-20 carbons, either linear, branched or in rings, with at least two carbons each substituted with at least one hydroxyl group.

96. The electrolytic capacitor of claim 93 wherein said non-ionic polyol is selected from the group consisting of erythritol, ribitol, xylitol, pentaerythritol, 2,2-dimethyl-1,3-propanediol; sorbitol, manitol, trimethylolethane, di-trimethylolpropane, glucose, fructose, sucrose and lactose, glycerol, diglycerol, triglycerol, tetraglycerol, polyglycerols.

97. The electrolytic capacitor of claim 93 wherein said polyalkylene ether is selected from the group consisting of polyalkylene glycols, polyepichlorohydrins, polyoxetanes, polyphenylene ethers and polyether ketones.

98. The electrolytic capacitor of claim 97 wherein said polyalkylene ether is selected from the group consisting of polyethylene glycols, polypropylene glycols and polytetramethylene glycols.

99. The electrolytic capacitor of claim 90 wherein said functional additive is selected from the group consisting of ethoxylated alkylphenols; ethoxylated or propoxylated $C_6$-$C_{24}$ fatty alcohols; polyoxyethylene glycol alkyl ethers having the general formula: $CH_3-(CH_2)_{10-16}-(O-C_2H_4)_{1-25}-OH$, polyoxypropylene glycol alkyl ethers having the general formula: $CH_3-(CH_2)_{10-16}-(O-C_3H_6)_{1-25}-OH$; polyoxyethylene glycol octylphenol ethers having the following general formula: $C_8-H_{17}-(C_6H_4)-(O-C_2H_4)_{1-25}-OH$ polyoxyethylene glycol alkylphenol ethers having the following general formula: $C_9-H_{19}-(C_6H_4)-(O-C_2H_4)_{1-25}-OH$, polyoxyethylene glycol esters of $C_{8-24}$ fatty acids, and polyoxyethylene glycerol alkyl esters, polyoxyethylene glycol ethers of $C_8$-$C_{24}$ fatty acids (and block copolymers of polyethylene glycol.

100. The electrolytic capacitor of claim 90 wherein said functional additive is selected from the group consisting of octaethylene glycol monododecyl ether, pentaethylene glycol monododecyl ether, nonoxynol-9, polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, PEG-20 castor oil, PEG-3 castor oil, PEG 600 dioleate, PEG 400 dioleate, polyoxyethylene-23 glycerol laurate, polyoxyethylene-20 glycerol stearate, polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether and polyoxyethylene-6 tridecyl ether.

\* \* \* \* \*